US009919233B2

(12) United States Patent
Bear et al.

(10) Patent No.: US 9,919,233 B2
(45) Date of Patent: *Mar. 20, 2018

(54) REMOTE CONTROLLED VEHICLE WITH AUGMENTED REALITY OVERLAY

(71) Applicant: MONKEYmedia, Inc., Austin, TX (US)

(72) Inventors: Eric Justin Gould Bear, Austin, TX (US); Rachel M. Strickland, San Francisco, CA (US); Jim McKee, San Francisco, CA (US)

(73) Assignee: MONKEYmedia, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/694,210

(22) Filed: Sep. 1, 2017

(65) Prior Publication Data

US 2018/0028931 A1  Feb. 1, 2018

Related U.S. Application Data

(63) Continuation of application No. 15/426,697, filed on Feb. 7, 2017, now Pat. No. 9,782,684, which is a
(Continued)

(51) Int. Cl.
*G09G 5/00* (2006.01)
*A63H 30/04* (2006.01)
(Continued)

(52) U.S. Cl.
CPC ............ *A63H 30/04* (2013.01); *A63F 13/211* (2014.09); *A63F 13/235* (2014.09); *A63F 13/45* (2014.09);
(Continued)

(58) Field of Classification Search
CPC .. G05D 1/0038; G06F 3/012; H04N 5/23203; H04N 7/15; H04N 13/0203; G06T 19/003; A63H 30/04
(Continued)

(56) References Cited

U.S. PATENT DOCUMENTS 5,602,566 A   2/1997  Motosyuku et al.
5,692,212 A   11/1997 Roach
(Continued)

FOREIGN PATENT DOCUMENTS

GB    2378878 A    2/2003
WO    98/15920     4/1998
(Continued)

OTHER PUBLICATIONS

Non-Final Office Action, U.S. Appl. No. 15/186,776, dated Aug. 18, 2016, 23 pages.
(Continued)

*Primary Examiner* — Ryan R Yang
(74) *Attorney, Agent, or Firm* — Meyertons, Hood, Kivlin, Kowert & Goetzel, P.C.; Gareth M. Sampson

(57) ABSTRACT

In some embodiments, extemporaneous control of remote objects can be made more natural using the invention, enabling a participant to pivot, tip and aim a head-mounted display apparatus to control a remote-controlled toy or full-sized vehicle, for example, hands-free. If the vehicle is outfitted with a camera, then the participant may see the remote location from first-person proprioceptive perspective.

20 Claims, 16 Drawing Sheets

Related U.S. Application Data continuation of application No. 15/186,793, filed on Jun. 20, 2016, now Pat. No. 9,579,586, which is a continuation of application No. 13/540,695, filed on Jul. 3, 2012, now abandoned.

(60) Provisional application No. 61/666,216, filed on Jun. 29, 2012.

(51) Int. Cl.
*A63F 13/92* (2014.01)
*A63F 13/235* (2014.01)
*A63F 13/211* (2014.01)
*A63H 33/22* (2006.01)
*A63F 13/45* (2014.01)

(52) U.S. Cl.
CPC ............ *A63F 13/92* (2014.09); *A63H 33/22* (2013.01); *A63F 2300/204* (2013.01)

(58) Field of Classification Search
USPC ........................................ 345/633
See application file for complete search history.

(56) References Cited

U.S. PATENT DOCUMENTS

| | | | |
|---|---|---|---|
| 5,904,724 | A | 5/1999 | Margolin |
| 6,160,744 | A * | 12/2000 | Kajigaya ............... G11C 5/025 365/189.02 |
| 6,201,544 | B1 | 3/2001 | Lands |
| 6,285,392 | B1 | 9/2001 | Satoda et al. |
| 6,393,158 | B1 | 5/2002 | Gould et al. |
| 6,621,980 | B1 | 9/2003 | Gould et al. |
| 7,004,838 | B2 | 2/2006 | Hayashida et al. |
| 7,467,218 | B2 | 12/2008 | Gould et al. |
| 7,625,287 | B2 | 12/2009 | Champagne et al. |
| 7,631,277 | B1 | 12/2009 | Nie et al. |
| 7,688,306 | B2 | 3/2010 | Wehrenberg et al. |
| 7,865,834 | B1 | 1/2011 | van Os et al. |
| 7,890,648 | B2 | 2/2011 | Gould et al. |
| 8,122,143 | B2 | 2/2012 | Gould et al. |
| 8,269,175 | B2 | 9/2012 | Alameh et al. |
| 8,634,969 | B2 | 1/2014 | Buelthoff et al. |
| 8,797,260 | B2 | 8/2014 | Mao et al. |
| 8,872,854 | B1 | 10/2014 | Levitt |
| 8,907,943 | B2 | 12/2014 | Piemonte |
| 8,928,696 | B1 | 1/2015 | Yang |
| 9,001,154 | B2 * | 4/2015 | Meier ..................... G06T 19/00 345/619 |
| 9,185,379 | B2 | 11/2015 | Gould et al. |
| 9,441,985 | B2 | 9/2016 | Riley |
| 9,563,202 | B1 * | 2/2017 | Bear ................ H04N 21/42224 |
| 9,579,586 | B2 * | 2/2017 | Bear ..................... H04N 5/445 |
| 9,612,627 | B2 * | 4/2017 | Bear ................ H04N 21/42224 |
| 9,656,168 | B1 * | 5/2017 | Bear ..................... A63F 13/525 |
| 9,658,617 | B1 * | 5/2017 | Bear ..................... G05D 1/0038 |
| 9,782,684 | B2 * | 10/2017 | Bear ..................... A63H 30/04 |
| 9,791,897 | B2 * | 10/2017 | Bear ..................... G06F 1/1694 |
| 2004/0169676 | A1 | 9/2004 | Williams et al. |
| 2007/0149282 | A1 | 6/2007 | Lu et al. |
| 2008/0063400 | A1 | 3/2008 | Hudson et al. |
| 2008/0070684 | A1 | 3/2008 | Haigh-Hutchinson |
| 2010/0328344 | A1 * | 12/2010 | Mattila ................. G06F 1/1626 345/633 |
| 2012/0040759 | A1 | 2/2012 | Ito et al. |
| 2012/0272175 | A1 | 10/2012 | Lin |
| 2012/0299961 | A1 * | 11/2012 | Ramkumar ....... G06F 17/30047 345/632 |
| 2013/0187953 | A1 * | 7/2013 | Matsumura .......... G06K 9/6201 345/633 |
| 2014/0002580 | A1 | 1/2014 | Bear et al. |
| 2014/0002581 | A1 | 1/2014 | Bear et al. |
| 2014/0002582 | A1 | 1/2014 | Bear et al. |
| 2014/0063055 | A1 * | 3/2014 | Osterhout ............... G06F 3/005 345/633 |
| 2014/0297098 | A1 | 10/2014 | Yoshimoto et al. |
| 2015/0170417 | A1 * | 6/2015 | Palm ..................... G06T 19/006 345/633 |
| 2015/0302756 | A1 | 10/2015 | Guehring et al. |

FOREIGN PATENT DOCUMENTS

| | | |
|---|---|---|
| WO | 01/86920 A2 | 11/2001 |
| WO | 03/001340 A2 | 1/2003 |
| WO | 2008/094458 A1 | 8/2008 |

OTHER PUBLICATIONS

Pre-Interview First Office Action, U.S. Appl. No. 15/186,783, dated Sep. 30, 2016, 17 pages.
Pre-Interview First Office Action, U.S. Appl. No. 15/186,793, dated Sep. 23, 2016, 5 pages.
Notice of Allowance, U.S. Appl. No. 15/186,783, dated Dec. 1, 2016, 25 pages.
Notice of Allowance, U.S. Appl. No. 15/186,793, dated Dec. 27, 2016, 39 pages.
Curriculum Vitae and Declaration of Nathan Shedroff under 37 CFR 1.132 regarding the 12A, B & C patent applications as submitted with an Appeal Brief during prosecution of Co-Pending U.S. Appl. No. 13/540,695 entitled, "Portable Proprioceptive Peripatetic Polylinear Video Player" to Bear et al. filed Jul. 3, 2012.
"Super Monkey Ball 2: Sakura Edition," SEGA Corporation <http://itunes.apple.com/us/app/super-monkey-ball-2-sakura/id363644188> and tutorial screenshots (captured Jun. 7, 2012).
Non-Final Office Action for U.S. Appl. No. 13/541,388 dated Jul. 22, 2014.
Applicant-Initiated Interview Summary for U.S. Appl. No. 13/541,388 dated Nov. 21, 2014.
Scagliarini et al. "Exciting understanding in Pompeii through on-site parallel interaction with dual time virtual models" VAST '01 Proceedings of the 2001 Conference on Virtual Reality, Archeology, and Cultural Heritage, 2001, pp. 83-90.
First Action Interview Pilot Program Pre-Interview Communication for U.S. Appl. No. 13/541,337 dated Jul. 22, 2014.
Applicant-Initiated Interview Summary for U.S. Appl. No. 13/541,337 dated Nov. 21, 2014.
First Action Interview Pilot Program Pre-Interview Communication for U.S. Appl. No. 13/540,695 dated Dec. 17, 2012.
Applicant-Initiated Interview Summary for U.S. Appl. No. 13/540,695 dated Mar. 19, 2013.
First Action Interview Office Action Summary for U.S. Appl. No. 13/540,695 dated Mar. 19, 2013.
Marsden et al., Navigation Control for Mobile Virtual Environments, MobileHCI '05 Proceedings of the 7th International Conference on Human Computer Interaction with Mobile Devices and Services, Sep. 2005, pp. 279-282.
Hurst et al., Mobile 3D Graphics and Virtual Reality Interaction, ACE '11 Proceedings of the 8th International Conference on Advances in Computer Entertainment Technology, Nov. 2011.
Final Office Action Summary for U.S. Appl. No. 13/540,695 dated Jun. 14, 2013.
Final Office Action Summary for U.S. Appl. No. 13/540,695 dated Apr. 24, 2014.
Examiner's Answer to Appeal Brief for U.S. Appl. No. 13/540,695 dated May 18, 2015.
Walking improves your cognitive map in environments that are large-scale and large in extent, Roy A. Ruddle, Ekaterina Volkova and Heinrich H. Bi.ilthoff, ACM Transactions on Computer-Human Interaction, v.18 n. 2, p. 1-20, Jun. 2011.
Notice of Allowance, U.S. Appl. No. 15/186,776, dated Feb. 13, 2017, 32 pages.

\* cited by examiner

Lean / Pivot Frontally to Move Forward or Back

Rotate to Aim in New Direction

Tip Laterally to Sidestep

REMOTE CONTROLLED VEHICLE WITH AUGMENTED REALITY OVERLAY

CROSS-REFERENCE TO RELATED APPLICATIONS

This application is a continuation of U.S. patent application Ser. No. 15/426,697 entitled "REMOTE CONTROLLED VEHICLE WITH A HANDHELD DISPLAY DEVICE" filed on Feb. 7, 2017, which is a continuation of U.S. patent application Ser. No. 15/186,793 entitled "REMOTE CONTROLLED VEHICLE WITH A HANDHELD DISPLAY DEVICE" filed on Jun. 20, 2016, which is a continuation of U.S. patent application Ser. No. 13/540,695 entitled "PORTABLE PROPRIOCEPTIVE PERIPATETIC POLYLINEAR VIDEO PLAYER" filed on Jul. 3, 2012, which claims priority to U.S. Provisional Patent Application No. 61/666,216 entitled "PORTABLE PROPRIOCEPTIVE PERIPATETIC POLYLINEAR VIDEO PLAYER" filed on Jun. 29, 2012, all of which are incorporated by reference herein.

FIELD OF THE INVENTION

The present inventors intend this invention to be understood by persons with expertise in the science of user-centered experience design ("UCD") and the art of interactive media ("IM"), including expertise in the functional specification of human-computer interfaces for digital media involving interactions between a participant and a hardware and/or software system. The person of ordinary skill in the art ("design expert" or "designer") need not be trained in computer engineering matters nor be able to implement the invention single-handedly.

The functional relationship between a designer and an engineer (who is skilled in writing code and/or building hardware) is akin to the relationship between the architect of a home and the builder of the home. The architect needs to know enough about structure and materials to be able to draft blueprints for the practical and aesthetic features of buildings, but may lack skills, credentials and equipment required to carry out the construction minimum qualifications for an interactive media designer include expertise in and appreciation of human factors as well as sufficient knowledge of hardware and software technology to be able to specify and/or direct engineer(s) in the building of systems to human-computer interaction specifications.

The U.S. patent classification for this patent should prioritize expertise in UCD for interactive media, human factors ("HF"), user experience ("UX"), user interface ("UI") and interaction design ("IxD") over engineering. The specification is intended for understanding by practitioners who have demonstrated real-world experience and technical/creative proficiency in the science of UCD, HF, UX, UI design and IxD for IM.

Inventors' Lexicon

For clarity and consistency of interpretation, the following terms used herein shall have the following definitions. If the definition of a term herein is in conflict with the ordinary and customary meaning of such term, the definition herein shall be the definition applied.

The term "computer" means a device or system with at least one microprocessor. Examples of computers include but are not limited to laptop computers, tablet computers, mobile phones, digital media players, game consoles, digital wristwatches, head-mounted display systems, digital televisions, set-top boxes and file servers. The term "device" is meant to be interchangeable with the term computer where it is clear from the context that the reference is to a computer as defined herein (i.e. with at least one microprocessor).

The terms "handheld device" and "handheld computing device" can be used interchangeably to mean (a) a computer that may be held or worn by a participant during use and/or (b) a computer that can detect motion of a participant's body in space. An example of the latter is a Microsoft X-BOX 360 equipped with Kinect motion sensing input hardware. Thus, the concepts described herein regarding detection of device postures and/or motions should be understood as inclusive of detection of postures and/or motions by a participant whose body is not in direct physical contact with a computer. For example, the described function of detecting the pivoting of a device around the device's x-axis is meant to be inclusive of the function of detecting the pivoting a participant's hand, for example, around an analogous x-axis of the participant or participant's hand.

The terms "computer readable medium" and "computer readable media" can be used interchangeably to mean storage that can be accessed by a computer. These terms include temporary transitory storage (such as data caches used by web browsers, streaming media players and digital video recorders), provided that neither term is intended to include any propagated signal, any carrier wave or any other non-statutory subject matter.

A "participant" means a person situated for interaction with a computer; and broadly encompasses a variety of terms commonly used to describe humans in relation to computers—including the words user, player, reader, viewer, listener, visitor, audience and audient (i.e. an audience of one). The hands visible in the figures are representative of participant's hands.

The term "configured" means the state of a device with software for performing identified functions. The phrase "capable of" is interchangeable with the phrase "configured for." Thus, a device lacking software for performing a particular identified function is not capable of performing this function even though the device might have the potential to be configured for performing such function by adding the necessary software.

"Software" means a set of instructions that when installed on a computer configures that computer with the readiness to perform one or more functions. The terms "computer program," "application" and "app" are meant to be synonymous with the term software.

The term "information" may be used to describe either or both machine-readable data and displayable content.

The term "content" means human-perceivable information such as still images, three-dimensional objects, text, movies, audio recordings, tactile data and tangible patterns. Content for display may be retrieved from memory storage (e.g. may be fixed and predetermined before a given participant experience) or may be computationally generated in part or in whole on the fly.

"Generate" means to cause something to exist—whether from scratch, from stored data, or a combination thereof.

The phrase "on the fly" means occurring in response to participant interaction, content triggers and/or other variables during a given participant experience. The specific outcome of an on the fly computation is neither fixed nor predetermined.

The noun "display" means an output device for conveying information to a participant, including but not limited to visual display hardware (such as LCD screens and image projectors), auditory display hardware (such as speakers and headphones), tactile display hardware (such as braille and textural haptics, piezoelectric vibration motors and force-feedback systems) and other sensory displays.

The verb "display" means to output information (e.g. visual, auditory and/or tactile content) for perception by a participant using one or more modalities of communication through one or more displays, thus allowing said participant to see, hear and/or feel said information.

A "production" means a collection of machine-executable instructions and content. "Production content" means the displayable portion of a production. "Production instructions" means the machine-executable portion of a production. Production content and production instructions may be fixed and predetermined before a given participant experience or may be computationally established in part or in whole on the fly.

"Run" and "execute" are used synonymously to mean to carry out machine executable instructions.

To "produce" means to dispatch the displayable content of a production for display and/or to run the executable portion of a production. To be clear, if a person inserts a DVD movie into a DVD player and presses the "play" button on the DVD player and the DVD player executes instructions to play the movie, then the player is "producing" the movie—whether or not any screens or speakers are connected to said DVD player. Producing is distinct from displaying; and producing does not require displaying to occur.

"Continuous play content" ("CPC") means audio and/or video content that will play continuously from beginning to end if there is no outside intervention. If a participant does nothing, for example, continuous play content has the inherent characteristic of continuing to play from a beginning (or early) point to an end (or later) point. This is distinct from a game, wherein if the player does nothing, the action either stops until the player takes an action or stops because the player failed to achieve an objective (e.g. the character controlled by the player is killed). CPC may be read from various locations, including but not limited to local storage on a device, from a remote storage location such as a server, or may be streamed live from a broadcast (one-to-many) such as a sporting event or a live point-to-point or multi-point videoconference.

The terms "videoconference stream" and "videoconference video" can be used interchangeably to mean CPC of videoconference attendee(s), slide(s), shared screen(s), whiteboard(s) and/or other CPC of a videoconference.

The noun "stream" means a sequence of data elements made available over time.

The verb "stream" means to transfer a sequence of data elements from one location to another (such as from local storage, from a remote storage location or from a live feed) for display or processing over time.

"Segment" means a stream or portion of a stream. Beginning and ending termini of a segment may be fixed and predetermined by a designer prior to a given participant experience, or one or both termini may be established on the fly.

A "segment descriptor" is information describing a segment. A segment descriptor may, but does not necessarily include information identifying parameters of a segment, such as a beginning or an ending terminus of the segment.

"Audio" and "audio content" mean a stream of auditory continuous play content. Examples include, but are not limited to, 8 bit and 16 bit linear pulse-code modulated ("PCM") audio, variable bit rate ("VBR") encoded audio, MP3 compressed audio files and CAFF containers with 16-bit little endian integer PCM formatted content. Audio content may also include sounds and/or soundtracks synthesized and/or mixed on the fly.

A "sprite" is a graphical, auditory and/or tactile content element (such as an animated character or informational overlay) that can be computationally modeled, managed and rendered separately from other content. Sprite animation sequences may be predetermined and/or calculated on the fly. Sprites are widely used in two-dimensional ("2D") and three-dimensional ("3D") computer games—moving characters and other objects independently of the game playfield. Sprites are also used in digital animation and film-making processes—compositing motion-capture avatars, for example, into real or fabricated scenes. But once the frames of a digital film are rendered for storage and/or transmission, the sprites are no longer produced as independently controllable entities.

"Video" and "video content" mean a stream of continuous play content that can be produced for display through a visual display, which may include or be accompanied by an audio stream. An example is a motion picture movie stored on film or an optical disc. "Video content," as used herein, does not include video signals containing manipulable animated sprites. And while sprites may be overlaid in front of, around or otherwise produced with sequences of frames of visual CPC, a visually displayed sprite/CPC combination is not video. The term "movie" is meant to be synonymous with the term video, and is inclusive of live transmissions such as videoconference streams and broadcast television programs.

For example, one popular video format in the year 2012 is a 1920 pixel×1080 pixel MPEG-4 movie storage file or live transmission stream encoded, stored and/or transmitted with an H.264 codec (compression coder decoder) for display at 29.97 frames per second. The video may be optionally associated with one or more audio soundtracks such as a stereo 44.1 kHz MPEG-4 audio storage file or live transmission stream encoded, for example, with an AAC codec at 256 kbits per second. One or more related videos and one or more related audio tracks may be stored and/or transmitted together in one or more bundled data file(s) or be referenced independently. Videos can be of any pixel dimensions, frame rate and compression.

U.S. Pat. No. 5,692,212 ("Roach") teaches a form of digital media production called an "interactive movie" that requires participant interaction to determine a course of events in a choose-your-own-adventure style game. Roach's "interactive movies" comprise a narrative storyline and navigable game environment over which short videos are superimposed from time to time. Despite the occasional inclusion of such video content, this genre of production is not continuous play content capable of being played passively from beginning to end without participant interaction. Thus, such "interactive movies" fall outside the definitions of "movie" and "video" and "video content" used herein.

To be clear, the term video is not meant to exclude interactivity or polylinearity. Moreover, special effects and other enhancements may complement a video in a given participant experience. Such enhancements may include but are not limited to annotations, overlays, subtitles, cues and machine-readable instructions for display transformations such as transitions and video pane entrance, exit, movement, resizing or other video pane transformations to occur at preset times or in response to participant interaction. Video interactions may range from basic media transport functions (such as pause, fast-forward, rewind, skip forward and skip back) to traversing links from a video to related content (whether or not such related content is video), traversing seamless expansions (U.S. Pat. No. 6,393,158, U.S. Pat. No. 6,621,980, U.S. Pat. No. 7,467,218, U.S. Pat. No. 7,890,648, U.S. Pat. No. 8,122,143 and U.S. patent application Ser. No. 13/348,624 by two of the three present inventors), engaging interactive advertisements or otherwise directing the flow of the video. The definition of the term video is, however, meant to be limited to a form of content that can be played from beginning—once initiated—to end, without further participant interaction.

To "play" means to produce a stream of audio and/or video content, whether said content is stored or live (e.g. a videoconference or broadcast show).

A "video player" or "player" is a device and/or application capable of playing one or more videos from beginning—once initiated—to end, without further participant interaction. Example video players are hardware and software DVD players, Blu-ray disc players, digital video recorders (such as TiVo Inc.'s TiVo Premiere), streaming movie applications (such as Netflix, Inc.'s Internet subscription service) and videoconferencing applications such as Microsoft Corporation's Skype and Apple, Inc. ("Apple") iChat and iMessage.

The noun "transition" means audio and/or visual content and/or effect(s) that is/are produced while passing from one portion of a production to another portion of the production.

The verb "transition" means to pass from one portion of a production to another portion of the production.

A "cue" is a prompt or guiding suggestion. A cue may act, for example, as an indicator to a participant to know what is possible to do or where it is possible to go. Cues may be communicated in any one or combination of modalities perceivable by participants, such as auditory, visual and tactile. Cues are not limited to discrete signifiers (such as an identifiable tone, textual overlay, graphical sprite or button), but may be action- or timing-based (e.g. whenever a dog in a video wags its tail for more than 2 seconds), or semantically hinted (e.g. whenever a person in a video makes reference to new possibilities).

"Highlighting" means to call attention to a cue or to other information using one or more of auditory, visual, tactile or other modalities.

The noun "link" means a rule or collection of rules that determines the selection of content to play, display or produce next. A link may be a predetermined connection or may be established on the fly. A link may contain or reference information about where it is coming from, but doesn't need to specify such information.

The verb "link" means to traverse a link.

"Polylinear" means a plurality of video and/or audio streams that play simultaneously for at least a portion of time. The beginnings of each stream participating in polylinearity need not occur simultaneously; and the endings of each stream participating in polylinearity need not occur simultaneously.

"Polyphonic" means sonic polylinearity comprising audio streams that may or may not be distinguishable from one another by a listener during simultaneous playback. Audio streams that are located apart from one another in a space allow for locational distinguishability by a listener, especially when displayed through two or more speakers associated with at least two audio channels (such as a left and a right channel). Polyphonic distinguishability may also be accomplished on devices with only a single speaker by lowering the volume of sounds located far away in a virtual environment, while raising the volume of sounds located nearby in the virtual environment.

A "video pane" is a virtual visual display surface where a video is rendered in a virtual environment. The video pane needs not be 2D (i.e. flat) or rectilinear, and could be invisible when no video content is present. The video content may be rendered as opaque or it can be transparent, allowing a participant to see through it. A video pane may optionally be sized to fill the entirety of a visual display or may optionally fill the entirety of a window containing a virtual environment in a windowed computer operating system environment such as Mac OS X or Microsoft Windows.

A "virtual environment" ("VE") is a multi-dimensional space in which content is produced for display. "Virtual camera" and "virtual camera view" mean the perspective from which a VE is produced for display to a participant. A "virtual speaker" is a location for sound in a VE.

"Perspective" means a set of one or more virtual camera variables relating to the production of a VE for display. Examples include location of the virtual camera in the VE, orientation of the virtual camera, field of view, depth of field and clipping planes.

Spatial "location" means the place where a point, a two-dimensionally defined region or a three-dimensionally defined region is situated in a VE or in the real world. "Temporal location" means a point in time or a span of time.

"Posture" means the position of a handheld device in relation to the Earth and/or a participant. Posture may be absolute (e.g. perpendicular to the ground and facing due east) or relative (e.g. slid left, tipped right, pushed or pulled). Posture may be used to describe either a single variable or a collection of variables.

"Orientation" means the facing of a person, virtual camera or device. The orientation of a person is the general direction their chest is facing. The orientation of a virtual camera is the general direction it points into a VE, thereby enabling a participant to look in that general direction in the VE. With regards to a handheld device, orientation is used herein to describe the aspect(s) of the device's posture related to rotation around a v-axis (defined below). Elsewhere in the industry, but not in this patent, the term orientation is used to describe whether a device is being held in landscape or portrait posture.

Environmental scale refers to the relative size of a physical or virtual environment. A VE that is "personal scale" is defined herein as no larger than 3×3×3 meters, while "architectural scale" is defined herein as larger than 3 meters in at least one dimension (width and/or length and/or height).

Vista complexity refers to whether participants have to travel through an environment to see, hear and/or feel the detail necessary for navigation (e.g. to see its full layout). "Single vista" VEs involve no occlusions; so all their virtual features can be perceived from a single location, even if it requires participants to rotate their orientation. In a "manifold vista" VE, participants must move around the environment in order to perceive its various features.

A device's "x-axis" means a reference axis in a 3D Cartesian coordinate space that passes horizontally through a device, in a given grip-position, extending through the left and right edges of the device through the plane of the visual display. X values will be described herein as increasing as they go right, but any axis labels and counting systems may be used to model and build the invention.

A device's "y-axis" means a reference axis in a 3D Cartesian coordinate space that passes vertically through a device, in a given grip-position, extending through the top and bottom edges of the device through the plane of the visual display. Y values will be described herein as increasing as they go up, but any axis labels and counting systems may be used to model and build the invention.

A device's "z-axis" means a reference axis in a 3D Cartesian coordinate space that passes perpendicularly through the visual display of a device, extending through the back and front surfaces of the device. Z values will be described herein as increasing as they come from the front of a device, generally towards a participant, but any axis labels and counting systems may be used to model and build the invention.

A participant's "craniocaudal axis" is a reference axis in a human-centered 3D Cartesian coordinate space that passes vertically through a participant generally along the participant's spine when standing or sitting upright. Spinning around on a barstool is an example of a rotation around the craniocaudal axis; and jumping up in the air is an example of travel along the craniocaudal axis. Craniocaudal values will be described herein as increasing as they go up from foot to head, but any axis labels and counting systems may be used to model and build the invention.

A participant's "anteroposterior axis" is a reference axis in a human-centered 3D Cartesian coordinate space that passes through a participant extending through the back and front of the participant. A cartwheel is an example of a rotation around the participant's anteroposterior axis; and walking is an example of travel along the anteroposterior axis. Anteroposterior values will be described herein as increasing as they go from the back to the front, but any axis labels and counting systems may be used to model and build the invention.

A participant's "mediolateral axis" is a reference axis in a human-centered 3D Cartesian coordinate space that passes laterally through a participant extending through the left and right sides of the participant. A somersault (i.e. forward roll) is an example of a rotation around the participant's mediolateral axis; and a side-shuffle is an example of travel along the mediolateral axis. Mediolateral values will be described herein as increasing as they go right, but any axis labels and counting systems may be used to model and build the invention.

"V-axis" herein means a vertical reference axis in planet-centric 3D Cartesian coordinate space (i.e. expressed by a plumb line that extends perpendicular to a planet's surface between the sky and the core of the planet, notwithstanding minor deviations due to distance from the equator). Rotation of a device or person around a v-axis may be described in absolute terms (e.g. facing due-east) or relative terms (e.g. rotated 15° counter-clockwise from a previous orientation). A standing participant's craniocaudal axis is an example of a v-axis outside a device; but a v-axis may also pass directly through a device.

"X-axisometer" herein means either an algorithmically fused plurality of sensors or a single sensor from a set of accelerometer(s) and gyro sensor(s) collectively capable of detecting information related to posture of and/or rotation of a device around the device's x-axis.

"X-axisometer data" means data from an x-axisometer. The x-axisometer data may be raw or processed information about the absolute posture of the device or about the device's posture relative to past data or relative to other reference data.

"Y-axisometer" herein means either an algorithmically fused plurality of sensors or a single sensor from a set of accelerometer(s) and gyro sensor(s) collectively capable of detecting information related to posture of and/or rotation of a device around the device's y-axis.

"Y-axisometer data" means data from an y-axisometer. The y-axisometer data may be raw or processed information about the absolute posture of the device or about the device's posture relative to past data or relative to other reference data.

"Z-axisometer" herein means either an algorithmically fused plurality of sensors or a single sensor from a set of accelerometer(s) and gyro sensor(s) collectively capable of detecting information related to posture of and/or rotation of a device around the device's z-axis.

"Z-axisometer data" means data from a z-axisometer. The z-axisometer data may be raw or processed information about the absolute posture of the device or about the device's posture relative to past data or relative to other reference data.

"V-axisometer" herein means either an algorithmically fused plurality of sensors or a single sensor from a set of magnetometer(s) (e.g. digital compass), gyro sensor(s) and accelerometer(s) collectively capable of detecting information related to rotation of a device around a v-axis.

"V-axisometer data" means data from a v-axisometer. The v-axisometer data may be raw or processed information about the absolute posture of the device and/or absolute orientation of the device or about the device's posture and/or orientation relative to past data or relative to other reference data. If a device is held vertically (i.e. with the screen perpendicular to the ground), then swinging it left or right around a participant could yield the same v-axisometer data as rotating the device around the device's y-axis (as in FIGS. 4C and 4D). If the device is laid flat (i.e. with the screen parallel to the ground), then swinging it left or right around a person could yield the same v-axisometer data as rotating the device around the device's z-axis (as in FIGS. 4E and 4F).

"Sensor reference data" means a value or range related to sensor-derived data from which determinations can be made about sensor data. Sensor reference data may indicate an "origin"—a set of one or more values used to determine whether sensor-derived data diverging from the set of one or more values in one or more directions will be used to effect change to a display-related variable in one or more directions (e.g. moving a virtual camera to the right in a VE). Sensor reference data may also indicate a "neutral zone"—a value or range of values used to determine whether sensor-derived data matching said value or falling within the bounds of said range of values will not cause changes to one or more display-related variables, thereby providing a participant the ability to comfortably hold a device in a resting posture without causing, for example, a virtual camera to change location and/or orientation. Sensor reference data may be fixed and predetermined by a designer before a given experience, or may be established in part or in whole on the fly. To account for variability in participant resting postures and postural stability, custom origins and neutral zones may be established and/or calibrated for each participant.

A "threshold" is a value that defines a boundary of a neutral zone. A threshold may be used in determining whether or not a device's posture will cause changes in the production of a VE.

To "damp" or "dampen" means to lessen the displayed result of a device input. This can be accomplished by applying a numerical transform function to one or more sensor-derived data variables. If applying a divide-by-five function, for example, to accelerometer-based pivot data, then a virtual camera could angle the contents of the screen by 1° for every 5° of device pivot instead of simply angling 5° for every 5° of device pivot. The numerical transform function need not be linear. Non-linear transforms and transforms that account for acceleration (e.g. relative speed of change of one or more input variable(s)) generally result in more natural participant experiences. Dampening factors related to device movement sensitivity in relation to velocities of virtual camera movement in a VE are good candidates for being set and/or calibrated, individually or en masse, by participants in a preferences panel.

To "amplify" means to increase the displayed result of a device input. This can be accomplished by applying a numerical transform function to one or more sensor-derived data variables. If applying a multiply-by-five function, for example, to accelerometer-based pivot data, then a virtual camera could angle the contents of the screen by 5° for every 1° of device pivot instead of simply angling 1° for every 1° of device pivot. The numerical transform function need not be linear. Non-linear transforms and transforms that account for acceleration (e.g. relative speed of change of one or more input variable(s)) generally result in more natural participant experiences.

The term "gestalt," when used in reference to a user experience or participant experience, describes a coordinated set of human-computer interactions and feedback mechanisms that is perceived by a participant as more than the sum of its constituent methods and apparatus(es).

The terms "pivot down," "pivoted down," "pivot up," "pivoted up," "pivot left," "pivoted left," "pivot right," "pivoted right," "tip right," "tipped right," "tip left," "tipped left," "aim left," "aimed left," "aim right," "aimed right," "slide left," "slide right," "slide down," "slide up," "pull," "push" and "view lock" are described below.

BACKGROUND

An age-old predicament in the field of human-computer interaction is that multi-dimensional virtual spaces (a.k.a. virtual environments, "VEs") are far more difficult for people to navigate than the real world. The VE's navigational interface is an important factor because it dictates the type and scope of body-based feedback provided to a participant. The Association for Computing Machinery, Inc. ("ACM") research paper Walking improves your cognitive map in environments that are large-scale and large in extent ("Ruddle") provides an informative overview of historical research and theoretical foundations [Roy A. Ruddle, Ekaterina Volkova and Heinrich H. Bülthoff, ACM Transactions on Computer-Human Interaction, v. 18 n. 2, p. 1-20, June 2011].

A particular design challenge arises when crafting natural interactions for systems in which participants are to be afforded control over both location and orientation in a VE. This is due to the fact that there are a limited number of ordinary gestures that translate to intuitive proprioceptive and vestibular relations between people, objects and the environment. Any control variables not readily mapped to natural body movements are therefore mapped to artificial user interfaces, such as joysticks, keyboards, multi-touch gestures and on-screen buttons and slider controls.

FIGS. 4A-5F illustrate a range of primitive motions readily sensible by handheld computing devices. The difficulty lies in picking the right combination of sensor mappings to compose an aggregate set of affordances that provide for natural and rewarding human-computer interaction. The objectives of the present invention prioritize participant motions for peripatetic locomotion control and side-to-side orientation control over up-and-down orientation control.

Virtual reality ("VR") applications have demonstrated different sets of tools and interaction methods in association with different types of devices for traversing fictional and/or simulated environments. While VEs on desktop computers provide almost no body-based information, head-mounted audio-visual displays ("HMDs") replace the sights and sounds of the physical world with those of a virtual world. Movement of the participant's head—rotations around the x-axis (looking up/down), the y-axis (turning head left/right) and the z-axis (cocking head left/right)—may be detected by the system and used as input to respectively influence the drawing of the elements of the virtual world on a visual display from the perspective of a virtual camera that tracks with the participant's eyes. The body's own kinesthetic awareness in motion furnishes proprioceptive and vestibular cues—boosting the participant's navigational sense.

Participants' control of their apparent locomotion within the VE has been accomplished using physical locomotion (i.e. literally walking through physical space), hand gestures (e.g. pointing in a direction to move), as well as directional and omnidirectional treadmills. Treadmills enable a 1:1 translation of directional participant movement into virtual locomotion. This is advantageous because physically moving the body supports participants' formation of mental models of distances traversed in the VE. Such interaction techniques have been shown to improve the accuracy of participant cognitive/spatial maps.

Ruddle reported on the effect of rotational vs. translational body-based information on participants' navigational performance (distance traveled) and cognitive mapping (direction and straight line distance estimates). Ruddle's research suggested that physical locomotion for spatial translation was not only more important than physical rotation in establishing participants' sense of where they are and where they have been in VEs, but that rotational body-based information had no effect on the accuracy of participants' cognitive maps over using a joystick. Ruddle teaches away from the invention disclosed herein by prioritizing physical locomotion over physical rotation.

Augmented reality ("AR") applications have demonstrated sets of tools and interaction methods for bridging the physical and virtual worlds, overlaying fictional and/or modeled objects and information elements over live views of the physical world. This has typically been accomplished by adding a real camera to the device, enabling the device to composite rendered objects into or over the scene captured by the real-world camera. On mobile phones and tablet computing devices so configured, the participant's movement of the device drives the display of content. As the viewfinder of a camera tracks with the location and orientation of the camera's lens, the displayed environment and augmented objects and information on the device may track with the movement of the handheld computing device.

Camera-based AR applications on handheld computing devices naturally rely upon sensing rotation around a device's y-axis (as in FIGS. 4C and 4D) and rotation around the x-axis (as in FIGS. 4A and 4B) for enabling participants to fully rotate the camera left, right, down and up. And because AR applications rely upon the physical environment as a framework, movement though the augmented space generally depends on a participant's physical location in real space (leveraging global positioning satellite ("GPS") data and magnetometer sensors). FIGS. 5E and 5F illustrate a participant moving a device backward and forward in physical space which could translate to moving backward and forward, respectively, in augmented space.

A related class of application are stargazing astronomy guides. Stargazing app interactions operate like AR app interactions, displaying labeled stars, constellations and satellites that correspond with the location (on Earth) and posture of the handheld device. Some stargazing apps operate in an AR mode, superimposing stellar information with a live camera feed from the device. Others forgo the camera feed to dedicate the entire visual display to stellar information. A participant located in Austin, Tex. sees representations of celestial objects in virtual space relative to their location in Austin. If, however, the participant desires to see the celestial objects as they would be seen from San Francisco, Calif., the participant would need to travel to San Francisco. This is impractical in the span of a single participant experience. Yet, the interaction mappings employed by AR applications seem to logically preclude virtual locomotion based on device posture. Since pivot up and down, for example, are used to look up and down in the sky, pivot up and down might logically preclude being mapped to locomotion backward and forward.

Physical locomotion can be impractical when using a virtual environment application on a handheld computing device—especially when operated in a space physically smaller than the virtual dimensions of a VE. Imagine, for example, walking around your living room in order to travel isometrically through a virtual museum. Your very real furniture and walls would present obstacles almost certainly not correlated to the galleries, corridors and three-dimensional sculptures available to be explored in the VE. Thus, a challenge is to develop techniques for providing participants as much body-based (proprioceptive and vestibular) sensory information as possible in the context of non-physical-locomotion-based interfaces for successful path traversal and path integration (i.e. cognitive mapping of a space based on navigational movements).

First-person shooter ("FPS") games have made use of a subset of VR techniques, modeling a virtual world for a participant to traverse while attempting to kill the inhabitants of said virtual world. The rendered world is generally drawn from the perspective of the eyes of the protagonist, with the protagonist's weapon portrayed at the bottom of the visual display. As with VR applications, the camera tracks with the facing and point-of-view of the protagonist. Screen real estate is a limiting factor in the design of controls for FPS games on handheld devices, thus solutions that avoid touchscreen interactions are advantageous.

A "rail shooter" or "on-rail game" is a similar type of game where participants cannot, however, control their direction of travel through the virtual environment—as if the course is confined to a fixed rail. A limited set of choices promise a choose-your-own adventure story, but the participant can neither deviate from the course nor backtrack along the way. Thus, the experience commonly focuses on shooting. Point of view is first-person or from just behind the protagonist, with a phallocentric gaze looking down the barrel of a gun as in FPS games. The participant does not need to worry about movement and generally does not have control over the camera.

In less-restrictive games, a participant may be afforded freedom to control both the location of a protagonist in space and the orientation of the protagonist's view. In such instances, the computer modifies both the coordinates and facing of the virtual camera in the virtual space to render the scene on the visual display. On handheld computing devices, motion sensors have been used to enable participants to aim weapons and simultaneously adjust the viewing orientation in the space. Movement through the virtual space, however, has generally been limited to on-screen directional controls.

Driving games on handheld devices have been designed to simulate driving real cars in a VE, providing both a physical interface for rotation and techniques for virtual locomotion not based on physical movement. Such games often use accelerometer and/or gyro sensors to detect rotation of a device around the z-axis (i.e. like an automobile steering wheel as in FIGS. 4E and 4F) for steering a virtual racecar. But despite the direct and seemingly obvious analogy to steering a real automobile, the present inventors have observed participants attempting to steer a virtual racecar in a racing game by swinging the device left or right around their own bodies. This performance error seems surprising, especially on the part of skilled drivers. While unsolicited, such reflex behaviors hint at the intelligence of body rotation as an actuator for rotation in more "intuitive" VEs.

SEGA Corporation's Super Monkey Ball 2: Sakura Edition is an example of a sensor-based navigation game that runs on Apple iPhone and iPad devices (collectively "iOS devices") [available at the time of writing in the Apple iTunes app store via http://www.sega.com/games/super-monkey-ball-2-sakura-edition/]. A participant controls the movement of an animated monkey sprite enclosed in a translucent ball (a "monkey ball") through a series of mazes in a VE by pivoting the device simultaneously around two axes. Pivoting up (i.e. rotating the device around its x-axis as in FIG. 4A) causes the monkey ball to roll forward; and the velocity of the monkey ball is related to the degree of pivot down from an origin. Pivoting down (i.e. rotating the device around its x-axis as in FIG. 4B) while the monkey ball is rolling forward causes the monkey ball to slow down. Pivoting down while the monkey ball is stationary causes it to turn around and face in the opposite direction. Pivoting right (i.e. rotating the device around its y-axis as in FIG. 4C) causes the monkey ball to rotate right; and pivoting left (i.e. rotating the device around its y-axis as in FIG. 4D) causes the monkey ball to rotate left.

Exemplary patent documents material to the consideration of sensor-based human interfaces for virtual space and video navigation on handheld devices include, but are not limited to U.S. Pat. No. 5,602,566 ("Motosyuku" et al.), WO 98/15920 ("Austreng"), U.S. Pat. No. 6,201,544 ("Lands"), WO 01/86920 A2 and WO 01/86920 A3 (collectively "Lapidot"), WO 03/001340 A2 ("Mosttov" et al.), GB 2378878 A ("Gaskell"), U.S. Pat. No. 7,631,277 ("Nie" et al.), U.S. Pat. No. 7,865,834 ("van Os" et al.), U.S. Pat. No. 7,688,306 ("Wehrenberg" et al.), WO 2008/094458 A1 ("Cook" et al.) and U.S. patent application Ser. No. 12/831,722 ("Piemonte"). Note that the below summaries are not meant to be exhaustive descriptions of each set of teachings, and the present inventors acknowledge that they may have unintentionally overlooked aspects disclosed that may be relevant to the present invention. Furthermore, these citations are not to be construed as a representation that a search has been made or that additional information may or may not exist that is material or that any of the items listed constitute prior art.

Motosyuku teaches scrolling a two-dimensional document on a display screen in accordance with pivot of a device. Rotation around the device's x-axis (as in FIGS. 4A and 4B) causes the document to scroll up or down. Rotation around the device's y-axis (as in FIGS. 4C and 4D) causes the document to scroll right or left.

Austreng teaches a method of storing and retrieving a series of two-dimensional images of a three-dimensional object taken along different viewing angles. In response to directional input, varying two-dimensional images are displayed, thereby creating the appearance of three-dimensional rotation of the displayed object. Austreng mentions in passing that "it is to be understood that the invention can be used with other digital data, such as digitized video," but it is unclear how said rotation simulation teachings could relate to video.

Lands teaches a modal use of device pivot to control operations selected from a group consisting of document paging, document zoom, device volume control and device brightness control. Sensor(s) are configured to measure changes in rotation of the device around the device's x-axis (as in FIGS. 4A and 4B) or around the device's y-axis (as in FIGS. 4C and 4D). Variables are changed by an amount proportional to the change in pivot of the device relative to a reference pivot.

Lapidot teaches a modal use of device movement to control selection of one of multiple options, to control panning within a document or to control zoom within a document (i.e. changing the resolution of a displayed image or the size of displayed text or picture). Lapidot teaches sensing movement of the device along the x-axis (as in FIGS. 5A and 5B), along the y-axis (as in FIGS. 5C and 5D) and along the z-axis (as in FIGS. 5E and 5F) using either accelerometers or a camera mounted on the device. Lapidot also teaches ignoring movements measuring below a predefined threshold value, and relating the rate of change of control variables with the speed or acceleration of the movement of the device.

Mosttov teaches gesture recognition techniques for a handheld device, discriminating between and prioritizing interpretation of inertial sensor data according to a hierarchy of classes of gestures. One or more discriminators is configured to recognize a specific class of gestures and each discriminator is associated with an interpreter that identifies specific gestures in the class. In one embodiment, if a discriminator detects linear or planar motion, then motion data is transferred to a planer gesture recognizer. But if no linear or planar motion is detected, then motion data may be transferred to a pivot gesture recognizer that determines the direction and degree of pivot of the device.

Gaskell teaches interaction techniques for simultaneously zooming and scrolling a two-dimensional image on a handheld device. The image is enlarged when the device, held parallel to the ground in a horizontal posture, is moved down (i.e. along the device's z-axis (as in FIG. 5F) perpendicular to the ground); and reduced in size or resolution when the device is moved up (as in FIG. 5E). The image is scrolled in any of four directions when the device is pivoted around the device's x-axis (as in FIGS. 4A and 4B) or y-axis (as in FIGS. 4C and 4D). The direction of scrolling corresponds to the direction of pivot, and the speed(s) of effect(s) are responsive to the speed(s) of movement of the device. Gaskell also makes a passing remark about "altering the apparent nature of the horizontal 'dead band' in which the moving stops" without further elaboration; and it is unclear what is meant.

Nie teaches techniques for creation of a three-dimensional VE scene containing layers of two-dimensional sprite objects that are displayed in such a way as to appear three-dimensional. Visual representations of each object corresponding to different orientations are assembled from a series of still images, animations or video clips to give each two-dimensional object three-dimensional characteristics. The source content for each sprite can be a single bitmap, a bitmap image sequence, a vector image, a video track, a live stream or a source specified by a universal resource locator ("URL"). Nie is clear that object movies are "not truly movies" and "not truly 3D."

Nie also teaches manipulation of the VE scene using desktop-computing interaction techniques (e.g. mouse movement, mouse clicking and keyboard input)—to effectuate rotating, panning, pivoting and zooming of objects and/or scenes using three-dimensional data translation vectors and rotation matrices. In this context, Nie teaches associating audio with scenes and objects, such that a soundtrack plays upon participant selection of an object. When the location of an object in the VE is changed, the three-dimensional location of the audio associated with the object may also be changed.

van Os teaches techniques for simultaneously displaying multiple video panes of videoconference streams in a single user interface designed to simulate a three-dimensional VE without the need for participant navigation or manipulation of said simulated VE. Apple first distributed this feature in the application iChat as part of Mac OS X v10.4 (a.k.a. Tiger). One participant hosts a group videoconference with up to three other participants, and everyone in the videoconference sees and hears the other participants. Video panes are displayed with orthographic projection relative to the participant so as to impart a sense of perspective. Side panes are angled inwardly towards a center location and foreground reflections are used to enhance the sense of presence of the participants, as if they are seated around a table. Animation is used to transition between events when participants enter and leave a videoconference; sliding video panes on or off screen. Otherwise, the video panes and the virtual camera remain in fixed locations.

Wehrenberg teaches techniques for performing a variety of functions in response to accelerometer-detected movement and orientation of a handheld device without a participant having to press and/or click buttons. Exemplary functions include reorienting a displayed document, triggering display of a page of a document, navigating an object or document that normally cannot be displayed entirely at once within the visual display of the device, activating/deactivating a device, motion compensation, impulse detection for controlled momentum transfer and other applications based on an accelerometer. With regards to navigating an image, Wehrenberg teaches zooming out in response to a participant pivoting the device up and zooming in when pivoting down.

In gaming contexts, Wehrenberg teaches holding and turning a device like a steering wheel; accelerating a vehicle when pivoting the device up and decelerating when pivoting down; aiming an airplane in a flying game up and down when pivoting up and down; and using pivot to look up, down and/or around. With regards to a VE, Wehrenberg teaches using a handheld device as a "window into a virtual reality image database. For example, a user holding the tablet can turn around and see the view looking backward from a position in a two or three dimensional image or object database as if the user walks into a virtual reality game space." That said, the present inventors do not believe such an interaction can be accomplished reliably, if at all, using the Wehrenberg taught accelerometer-based techniques due in part to the fact that accelerometers do not separate gravitational and inertial forces.

Cook explains another problem with Wehrenberg's enablement-lacking comment about looking backward: "accelerometers suffer from an inability to detect rotation around the force vector. So, for example, a motion application that depended on measuring rotation of a stationary device around the device's Y axis would work quite well when the device is horizontal, would become less accurate as the angle between the Y axis and the horizontal plane increases, and would become unpredictable as the Y axis becomes aligned vertically with the gravity vector." To address this problem, Cook uses camera data to help detect changes in orientation.

Cook teaches interaction techniques for circumscribing a virtual object using a handheld device. Pivoting the device (i.e. rotating around the device's x-axis or y-axis, as in FIGS. 4A-4D) controls the angle of view of the image and moving the device perpendicular to the screen (as in FIGS. 5E and 5F) controls the magnification. The result is analogous to orbiting around a real object in the physical world with a camera while looking through the camera's viewfinder. Yet in Cook's case, the visual display shows a virtual object that may not exist in the physical world. When the user moves the device, the view on the display moves; and when the user pivots the device, either the view pivots so that the image is displayed at an angle related to the pivot angle or the image scrolls in the direction of the pivot. A maximum pivot viewing threshold angle may be used to prevent from pivoting past a certain angle and to switch between control modes, such as between pivoting the view and scrolling the view. Cook teaches that pivot angle may be mapped to velocity using a linear, exponential or geometric equation and that "it may be useful to have the viewing angle change more or less than the [pivot] angle depending on usability factors." Cook also teaches techniques for centering the virtual camera view on a desired center-point of an image, bringing the line of sight perpendicular to that point on the image—using a motion of the device, a button push, a screen tap and/or a voice command.

Piemonte teaches use of orientation data from one or more sensors to navigate a three-dimensional perspective projection without a participant touching the visual display. As the participant pivots the device left or right around its y-axis (as in FIGS. 4C and 4D), the virtual camera view is turned left or right to reveal the left or right sides of a three-dimensional user interface VE, respectively. As the participant pivots the device down or up around its x-axis (as in FIGS. 4A and 4B), the virtual camera view is angled down or up to reveal the floor or ceiling of the VE, respectively. Angular rotation "can be measured or estimated from data provided by gyro sensors, accelerometers, magnetometers or any combination of sensor data that can provide an estimate of the orientation of mobile device relative to a reference axis of rotation." Piemonte also teaches constraining and scaling sensor data so that small rotations cause small virtual camera view changes while large rotations or motions (such as shaking the device) result in a "snap-to" jump of the virtual camera view to a predetermined orientation.

Design Problems

Today's most popular and widespread handheld computing devices, Apple's family of iOS devices, employ an assortment of sensors (including magnetometers, gyroscopes and accelerometers) for participant input and/or feedback. One problem confronting designers is that there are a limited number of dimensions of control and a myriad of independently taught discretely applied mapping options. The prior art teaches techniques for orbiting virtual objects, for panning and zooming documents, for controlling virtual vehicles and for navigating VEs that are generally personal scale and/or single vista. None alone or in combination teach or provide motivation for navigating an architectural scale manifold vista VE on a handheld device. Many combinations of the taught techniques would be incompatible or require sensor-use mode switching by the participant. Other combinations would be problematic because, in part, they would require extraordinarily impractical physical locomotion. In contrast, a more natural system would enable a participant to stand in a single physical location while changing orientation and traversing a VE using device sensors for virtual locomotion and providing proprioceptive feedback.

From a purely mathematical standpoint, many combinations of previously taught techniques for mapping sensor data are possible. But when it comes to human factors, getting the user experience right is rarely obvious. The sheer number of sensor-to-result interaction mappings available to designers makes appropriate combinatorial solutions even less evident, especially if there is an interest to spare participants from dealing with hardware buttons, software user interface elements or touch screens. None of the prior art, alone or in combination, provides motivation or guidance to a person skilled in the art for simultaneously mapping multiple dimensions of sensor data to interaction results for the successful creation of a navigable virtual environment, no less one containing a plurality of simultaneously playing videos, on a handheld device.

Another design problem is that there are more variables to be controlled than there are vectors of sensor data. For example, if rotation of a device around a device's y-axis is mapped to rotating the orientation of a virtual camera left and right, then the same maneuvers cannot reasonably be used to scroll a document or pan left and right in a VE; and vice-versa. If rotation of the device around its x-axis is mapped to rotating the orientation of a virtual camera up and down, then the same maneuvers cannot reasonably be used to zoom in or out on a document or move forward or backward in a VE; and vice-versa. And if rotation of the device around its z-axis is mapped to pivoting the virtual camera clockwise and counterclockwise, then the same interactions cannot reasonably be used to steer; and vice-versa. Every sensor/result interaction mapping choice precludes a direct mapping of the same sensor to a different result, and it is not obvious (a) which device sensor data set logically maps to which interaction result and (b) which mappings are compatible with one another for simultaneous utilization in a gestalt participant experience.

The experience designer, thus, needs to craft and resolve (i.e. invent): (1) a viable collection of sensor/result interaction mappings, (2) techniques for overloading sensor data utilization to obtain multiple feedback results from common data and (3) appropriate thresholds, damping rules, and other interpretation algorithms to accomplish a successful user experience. A person of ordinary skill in the art would appreciate the interplay of design creativity, trial and error prototyping, and real-world usability testing required to achieve a combination that works intuitively and effortlessly for a general audience of participants diverse in factors such as age, gender, reflex responses, spatial sensibility, patience, self-confidence, VE navigation experience and competency with electronic devices.

Gestalt Experience Motivations

Cinema and digital media have much to glean from architecture and place-making traditions. Places are structures of communication and collective memory. A place is an organization, and memory is often an articulation of space. The "Method of Loci" practiced by ancient Greek and Roman orators, for example, was a mnemonic technique that relied upon architectural recall for the extemporaneous recitation of epic poetry or lengthy discourses stored in memory [Frances Yates, *The Art of Memory*, University of Chicago, 1966]. The present invention is motivated to create a cinematic language of proprioceptive and peripatetic perception that yields new ways of experiencing the world around us—merging cinematic structure with architectural space in order to leverage formal and experiential principles inherent in the definitions of place.

Using audio spatialization techniques, the acoustic dimension of an embodiment of this invention is a kind of virtual walkabout sonic sculpture whose characteristics change to reflect and emphasize spatial qualities and treatments associated with the different video components, as well as the attention states of audients. To this end, distinct keynotes, signals, soundmarks and sonic treatments are mapped to spatial locations and temporal locations (i.e. points in or spans of time) in the VE. The collection of sonic treatments extends the vocabulary, in sound-for-film terms, of backgrounds, environmental and perspective shifts, interruptions and delays in time, subjective point of view ("POV") sequences and spatial montage. Musical elements and metaphysical sounds moreover arise in a theater of the mind whose outlines emerge as participants learn to suspend disbelief within this new image sound field.

In a topographic meander, the visitor becomes aware of localized sonic regions in the process of traversing the VE. Although occurring in the vicinity of image-sound streams that a participant can see, these off-screen sound sources may remain invisible and spatially discrete. Additional sounds (such as those that issue from virtually passing motor vehicles, birds in flight, a gust of wind, the torrent of a river, or a flute player's melody carried by a tease of breeze) literally travel through the VE, with potential Doppler effects.

Departing from one-way linear cinema played on a single rectangular screen, this multi-channel virtual environment involves a cinematic paradigm that undoes habitual ways of framing things, employing architectural concepts in a polylinear video sound construction to create a kind of motion picture that lets the world reveal itself and permits discovery on the part of participants. Supporting such experiences via handheld device requires easy and comfortable techniques for peripatetic navigation through virtual space that provide sufficient navigational feedback regarding said virtual space to a participant, that leverage the participant's human spatial memory to form a proprioceptive sense of location in space, that make it easy for participants to navigate amongst a plurality of simultaneously playing videos, that make it easy for participants to center their view in front of individual video panes in said space, that make it comfortable for participants to rest in a fixed posture and orientation while selectively viewing one or another of the video streams, and that provide spatialized 3D audio cues that invite participant awareness of other content unfolding simultaneously in the virtual environment.

SUMMARY

Polylinear video affords a language that is more akin to architecture than storytelling for capturing and articulating a kind of experience that belongs to many different dimensions. This invention supports approaches to cinematic construction that employ ambulatory, multiple and simultaneous viewpoints—such as humans exercise when orienting ourselves in physical space. Responsive elements in this peripatetic cinemascape are intended for the purpose of making people conscious of their own perceptual meanders, trajectories and drifts of attention.

This invention involves a novel and non-obvious combination of input sensor data mappings that effectuate human-computer interactions readily understood and performed by participants in order to accomplish both navigation and orientation in virtual space using a handheld computing device. Another aspect of this invention pertains to the simultaneous production of a plurality of spatially distributed motion-picture videos through the visual display of a handheld computing device. Another aspect of this invention pertains to the spatialization of a plurality of soundtracks associated with a plurality of motion-picture videos for auditory display via a handheld computing device.

BRIEF DESCRIPTION OF THE DRAWINGS

FIG. 6A represents a device starting posture while FIGS. 6B and 6C represent interaction sequence transition states.

FIG. 6D represents a device starting posture while FIGS. 6E and 6F represent interaction sequence transition states.

FIG. 8A represents a device starting posture while FIGS. 8B and 8C represent interaction sequence transition states.

FIG. 8D represents a device starting posture while FIGS. 8E and 8F represent interaction sequence transition states.

FIG. 10A represents a device starting posture while FIGS. 10B and 10C represent interaction sequence transition states.

FIG. 10D represents a device starting posture while FIGS. 10E and 10F represent interaction sequence transition states.

Like reference numerals in the various drawings indicate like elements. And as described above, like reference numerals apply to all like elements in the drawings including those like elements absent reference numeral indicia in a given view.

DETAILED DESCRIPTION

The present invention comprises techniques for using, and configuring for use, a handheld computing device with simple human body "language" integrating ordinary locomotion, orientation and stabilization gestures to navigate and explore polylinear audio and video streams produced for display through multiple video panes and virtual speakers that are spatially distributed in a virtual environment of architectural scale and manifold vistas, for peripatetic discovery and perusal with proprioceptive feedback; all without the need for button, keyboard, joystick or touchscreen interaction.

Figure 1:
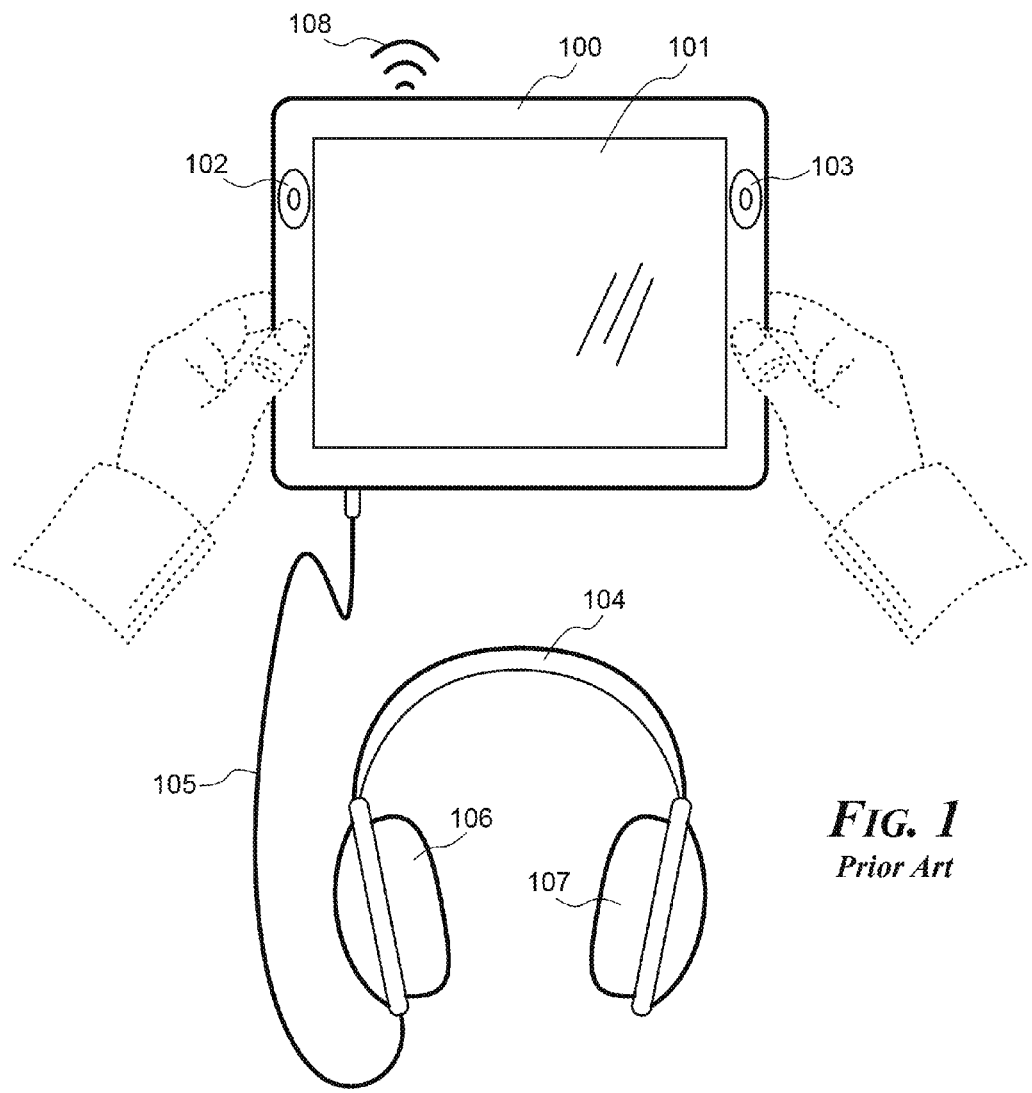
FIG. 1 illustrates a representative prior-art handheld computing device.

FIG. 1 illustrates a representative prior-art handheld computing device 100 with a visual display 101, auditory displays (i.e. speakers) 102 on the left and 103 on the right, headphones 104 with auditory displays 106 on the left and 107 on the right, a representative data transport connection 105 between device 100 and headphones 104, and a wireless data transport signal 108 to and/or from device 100. The inventors intend device 100 and its constituent components to be recognized as such throughout FIGS. 2-10F, whether or not identified by reference numeral indicia in each of said figures.

If building an embodiment of the invention for an Apple iOS device, designer directed engineer(s) may construct aspects of the system using Apple's Xcode developer tools [available at the time of writing in the Apple App Store] and a computer programming language such as Objective C. Xcode provides ready-to-use libraries of code that engineers may use in building embodiments of the invention, with application programming interfaces (each an "API") to those code libraries. Apple provides a wealth of technical resources on developing apps for iOS devices on the iOS Dev Center [at the time of writing via http://developer.apple.com/]. Apple's online iOS Developer Library includes getting started guides, sample code, technical notes, articles and training videos.

Virtual Environment

Figure 2:
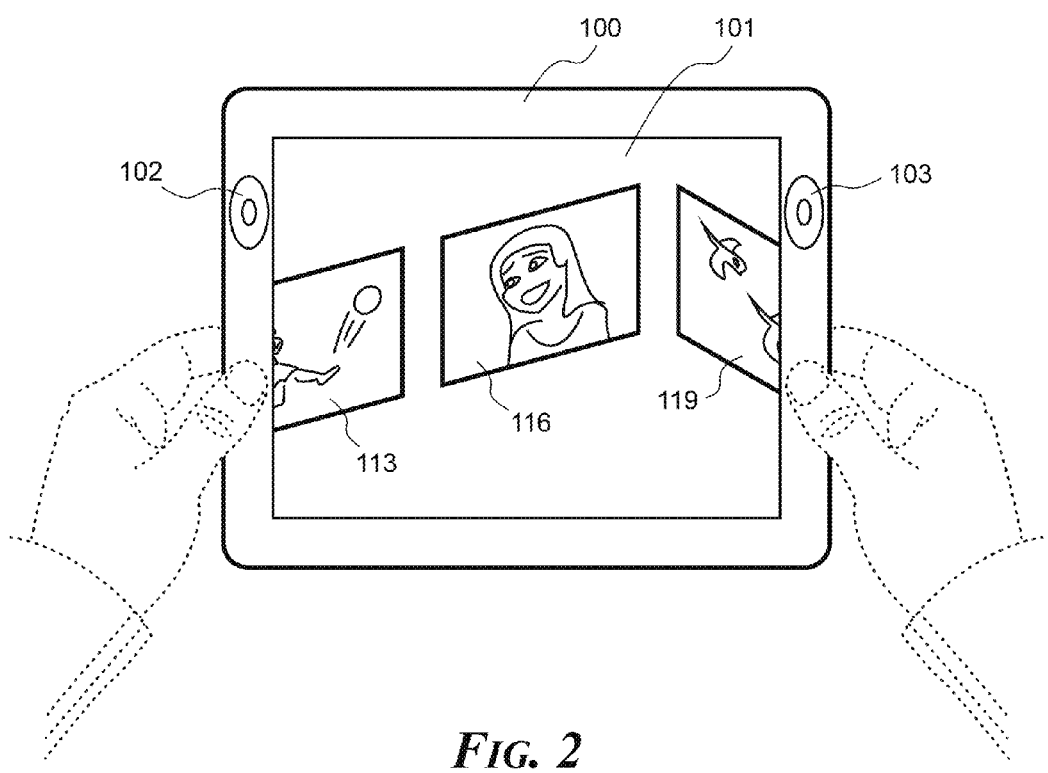
FIG. 2 illustrates a handheld computing device with three videos playing simultaneously.

FIG. 2 illustrates device 100 with three videos playing simultaneously. Video pane 113 is representative of a broadcast soccer match. Video pane 116 is representative of a live videoconference stream. Video pane 119 is representative of a locally stored documentary film about bird songs.

Figure 3:
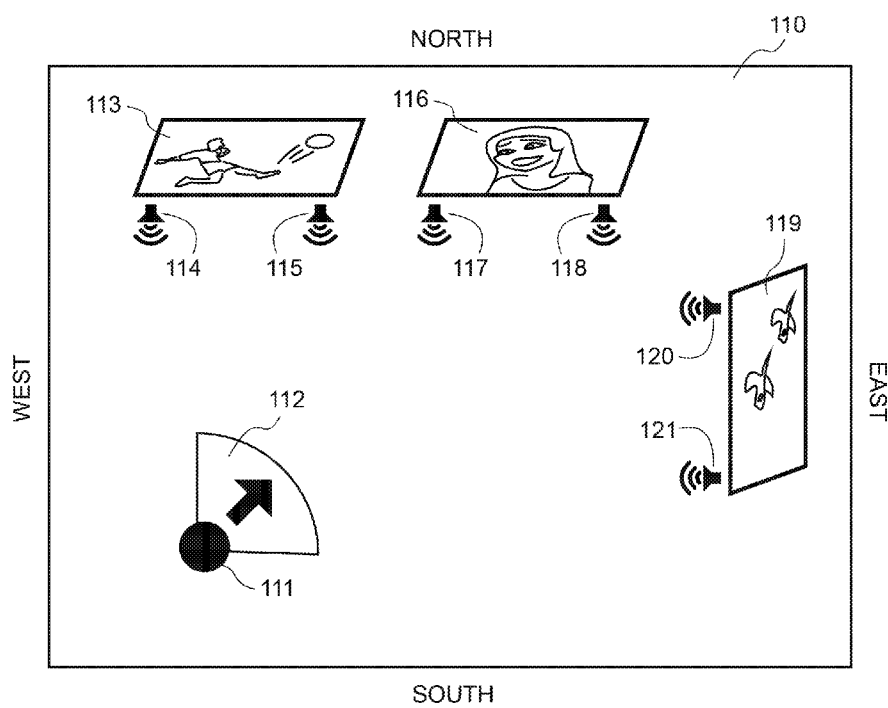
FIG. 3 illustrates a representative model of a virtual environment.

FIG. 3 illustrates a representative model of a virtual environment 110 containing video panes 113 and 116 to the north and video pane 119 to the east. Video pane 113 is associated with two spatially situated virtual speakers for channels of audio 114 (left) and 115 (right); video pane 116 with audio 117 (left) and 118 (right); video pane 119 with audio channels 120 (left) and 121 (right). Virtual camera 111 is located in the southwest region of the space with a lens orientation 112 facing towards the northeast. The inventors intend video panes 113, 116 and 119, and their respective virtual speakers 114, 115, 117, 118, 120 and 121 and virtual camera 111 and orientation 112 to be recognized as such throughout FIGS. 3-11F, whether or not identified by reference numeral indicia in each of said figures.

Such a VE may be built using an OpenGL API such as OpenGL ES version 2.0. Techniques for 3D engineering are taught in books such as *Beginning iPhone Games Development* by Peter Bakhirev, P J Cabrera, Ian Marsh, Scott Penberthy, Ben Britten Smith and Eric Wing [Apress, 2010].

Video may be built into a VE by texture mapping frames of video during playback onto an object surface in the VE. Code libraries by Dr. Gerard Allan for texturing of streamed movies using OpenGL on iOS are available from Predictions Software Ltd [at the time of writing via http://www.predictions-software.com/], including APIs to features engineered in support of instantiation of preferred embodiments of the present invention.

A single movie file may be used as a texture atlas for multiple synchronized video panes in a VE. To accomplish this, a portion of each video frame (e.g. a top-left quadrant, a top-right quadrant, a bottom-left quadrant or a bottom-right quadrant) may be texture mapped to a separate video pane in the VE. By dividing each video frame into four regions, only one movie file need be streamed at a time to produce a polylinear video experience comprising four unique video panes. This technique theoretically improves responsiveness to participant interaction by reducing processor load and increasing rendering speed.

An OpenAL API may be used for building 3D spatialized audio into a VE. Techniques for buffering and spatializing streamed audio files are taught in books such as *Learning Core Audio: A Hands-On Guide to Audio Programming for Mac and iOS* by Chris Adamson and Kevin Avila [Addison-Wesley Professional, 2012]. The OpenAL 1.1 specification and programmers guide is available from Creative Labs, Inc. [at the time of writing via http://connect.creativelabs.com/openal/].

OpenAL enables a designer to specify the location of each virtual speaker in the VE, the direction the virtual speaker is facing in the VE, a roll-off factor (i.e. the attenuation range of a virtual speaker), a reference distance (i.e. the distance that a virtual speaker's volume would normally fall by half), a maximum distance (i.e. the distance at which the virtual speaker becomes completely inaudible) and other parameters. OpenAL on iOS currently supports production of up to 32 tracks of simultaneously playing sounds, all ultimately rendered down to a left-to-right stereo mix.

Device Posture & Motion

Figure 4A:
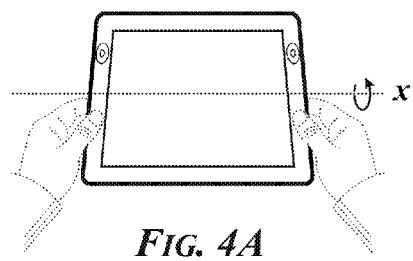
FIGS. 4A and 14A illustrate a "pivot down" motion or "pivoted down" posture.
Figure 14A:
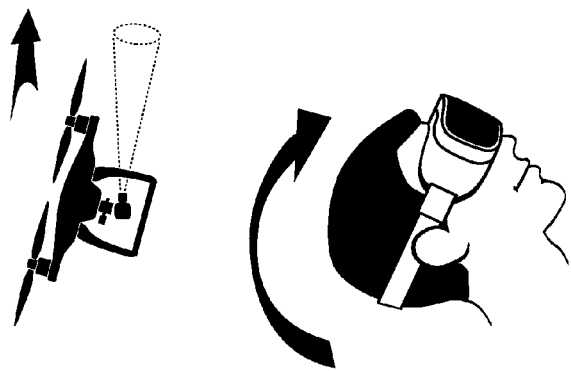

FIGS. 4A and 14A illustrate a "pivot down" motion or "pivoted down" posture, in this case a rotation of a device around its x-axis such that the top edge of the device moves further from an upright participant and/or the bottom edge of the device moves closer to the participant. Certain preferred embodiments of the invention use x-axisometer data to determine the degree of pivot down of a device, comparing said data to a sensor reference data that indicates both a pivot down origin and a pivot down neutral zone threshold. If the x-axisometer data indicates a pivot down greater than the pivot down origin but less than the pivot down neutral zone threshold, then the pivot down does not cause a change of location of the virtual camera in the VE. If the x-axisometer data indicates pivot down greater than the pivot down neutral zone threshold, then the pivot down causes a change of location of the virtual camera in the VE.

In one preferred embodiment, the pivot down origin is preset at Δ25° pivoted down from vertical and the pivot down neutral zone threshold is preset at Δ10° from the origin. Pivot down origin preference, however, varies from participant to participant. Some prefer to look down at a device; others prefer to hold the device up high with arms outstretched. In an alternate preferred embodiment, the pivot down origin is established on the fly by identifying the average resting posture of the device for a given participant during app launch. Origins and neutral zone thresholds may also be set and/or calibrated, individually or en masse, by participants in a preferences panel.

X-axisometer data may be derived, for example, from an iOS UI Accelerometer object data feed. Apple's Accelerometer Filter sample code implements a low and high pass filter with optional adaptive filtering. This readily adoptable code smoothes out raw accelerometer data, which can then be converted to an angular value. Apple, Google, Microsoft and other device platform manufacturers also provide sensor fusion algorithm APIs, which can be programmatically employed to smooth out the stream of sensor data. Apple's Core Motion API uses gyroscope data to smooth out accelerometer data, providing interpolation and fine grain corrections for x-axisometer data free from delayed response and drift.

In certain preferred embodiments, when the device is held perpendicular to the physical ground—the pivot down origin in certain preferred embodiments—then the virtual camera view is established parallel with the virtual ground in the VE, as if looking straight ahead. When the device is pivoted down from the pivot down origin, then the virtual camera is rotated around the virtual camera's x-axis to moderately drop the vertical center of the virtual camera closer to the virtual ground, as if the participant dropped their gaze slightly downward. The adjusted angle of the virtual camera need not have a 1:1 correlation with the posture of the device. In a preferred embodiment, the degree of vertical drop of the virtual camera view is dampened in comparison to the degree of pivot down by a factor of five. For every Δ1° of pivot down, the camera view is angled down by Δ0.2°. This provides sufficient feedback for the participant to maintain awareness of their movement of the device while softening that feedback enough to avoid distraction. In certain preferred embodiments, the degree of angle down of the virtual camera view is capped at a maximum drop of Δ10° down from straight ahead to stabilize the participant experience while the virtual camera is changing position.

Figure 4B:
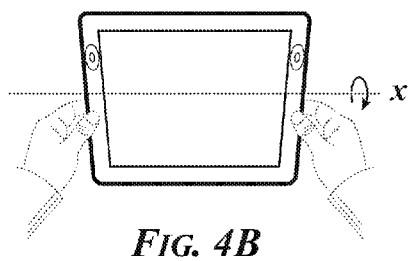
FIG. 4B illustrates a "pivoted up" posture or "pivot up" motion.

FIG. 4B illustrates a "pivoted up" posture or "pivot up" motion, in this case a rotation of a device around its x-axis such that the top edge of the device moves closer to an upright participant and/or the bottom edge of the device moves further from the participant. Preferred embodiments of the invention use x-axisometer data to determine the degree of pivot up of a device, comparing said data to a sensor reference data that indicates both a pivot up origin and a pivot up neutral zone threshold. If the x-axisometer data indicates a pivot up greater than the pivot up origin but less than the pivot up neutral zone threshold, then the pivot up does not cause a change of location of the virtual camera in the VE. If the x-axisometer data indicates pivot up greater than the pivot up neutral zone threshold, then the pivot up causes a change of location of the virtual camera in the VE.

In one preferred embodiment, the pivot up origin is preset at Δ25° pivoted down from vertical and the pivot up neutral zone threshold is preset at Δ10° from the origin. Pivot up origin preference, however, varies from participant to participant. Some prefer to look down at a device; others prefer to hold the device up high with arms outstretched. In an alternate preferred embodiment, the pivot up origin is established on the fly by identifying the average resting posture of the device for a given participant during app launch. Origins and neutral zone thresholds may also be set and/or calibrated, individually or en masse, by participants in a preferences panel.

In certain preferred embodiments, when the device is held perpendicular to the physical ground—the pivot down origin in certain preferred embodiments—then the virtual camera view is established parallel with the virtual ground in the VE, as if looking straight ahead. When the device is pivoted up from the pivot up origin, then the virtual camera is rotated around the virtual camera's x-axis to moderately raise the vertical center of the virtual camera away from the virtual ground, as if the participant raised their gaze slightly upward. The adjusted angle of the virtual camera need not have a 1:1 correlation with the posture of the device. In a preferred embodiment, the degree of vertical rise of the virtual camera view is dampened in comparison to the degree of pivot up by a factor of five. For every Δ1° of pivot up, the camera view is angled up by Δ0.2°. This provides sufficient feedback for the participant to maintain awareness of their movement of the device while softening that feedback enough to avoid distraction. In certain preferred embodiments, the degree of angle up of the virtual camera view is capped at a maximum rise of Δ10° up from straight ahead to stabilize the participant experience while the virtual camera is changing position.

Figure 4C:
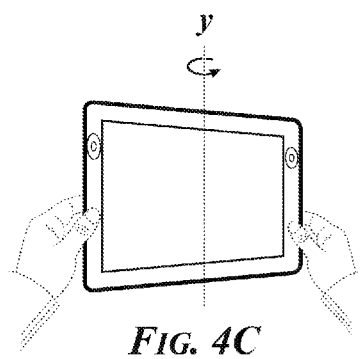
FIG. 4C illustrates a "pivot left" motion or "pivoted left" posture.

FIG. 4C illustrates a "pivot left" motion or "pivoted left" posture, in this case a rotation of a device counter-clockwise around its y-axis such that (a) the right edge of the device moves closer to the ground, (b) the left edge of the device moves further from the ground and/or (c) the device is aimed left. In certain embodiments of the invention, when the device is held in a vertical posture with the device's y-axis parallel to a v-axis, then pivot left interactions and aim left interactions may result in identical v-axisometer data. It would be understood by a person of ordinary skill in the art that any coincidentally matching sensor data results in such idiosyncratic circumstances have no bearing on the novelty of employing the presently disclosed techniques to obtain reliable results across all circumstances.

When the device is in a tipped up posture between vertical and horizontal, pivot left motions are difficult to humanly distinguish from tip left motions. In other words, participants intending to tip left have a tendency to pivot left at the same time. For these reasons, certain embodiments of the invention specifically avoid mapping any interaction results to y-axisometer data. Mapping of y-axisometer data to unique interaction results, when performed in the context of the present invention, must be carefully considered so as not to degrade the simplicity, ease and comfort of the participant experience.

Y-axisometer data independent of v-axisometer data may be derived, for example, from an iOS UI Accelerometer object data feed. Apple's Accelerometer Filter sample code implements a low and high pass filter with optional adaptive filtering. This readily adoptable code smoothes out raw accelerometer data, which can then be converted to an angular value. Apple, Google, Microsoft and other device platform manufacturers also provide sensor fusion algorithm APIs, which can be programmatically employed to smooth out the stream of sensor data. Apple's Core Motion API uses gyroscope data to smooth out accelerometer data, providing interpolation and fine grain corrections for y-axisometer data free from delayed response and drift.

Figure 4D:
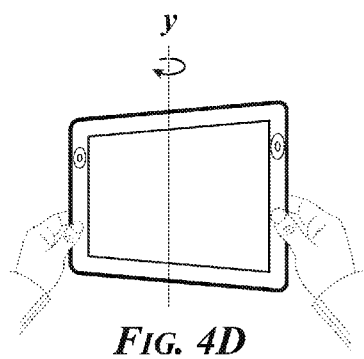
FIG. 4D illustrates a "pivot right" motion or "pivoted right" posture.

FIG. 4D illustrates a "pivot right" motion or "pivoted right" posture, in this case a rotation of a device clockwise around its y-axis such that (a) the left edge of the device moves closer to the ground, (b) the right edge of the device moves further from the ground and/or (c) the device is aimed right. In certain embodiments of the invention, when the device is held in a vertical posture with the device's y-axis parallel to a v-axis, then pivot right interactions and aim right interactions may result in identical v-axisometer data. It would be understood by a person of ordinary skill in the art that any coincidentally matching sensor data results in such idiosyncratic circumstances have no bearing on the novelty of employing the presently disclosed techniques to obtain reliable results across all circumstances.

When the device is in a tipped up posture between vertical and horizontal, pivot right motions are difficult to humanly distinguish from tip right motions. In other words, participants intending to tip right have a tendency to pivot right at the same time. For these reasons, certain embodiments of the invention specifically avoid mapping any interaction results to y-axisometer data. Mapping of y-axisometer data to unique interaction results, when performed in the context of the present invention, must be carefully considered so as not to degrade the simplicity, ease and comfort of the participant experience.

Figure 4E:
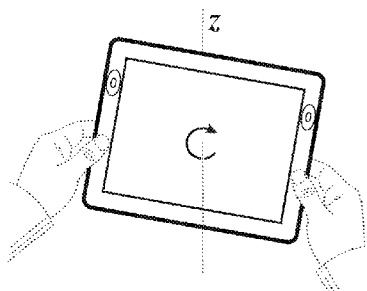
FIGS. 4E and 14E illustrate a "tip right" motion or "tipped right" posture.
Figure 14H:
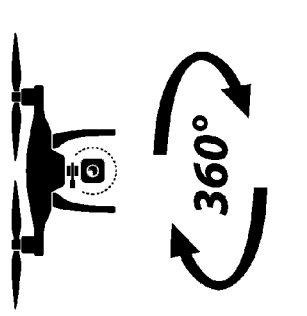
Figure 14E:
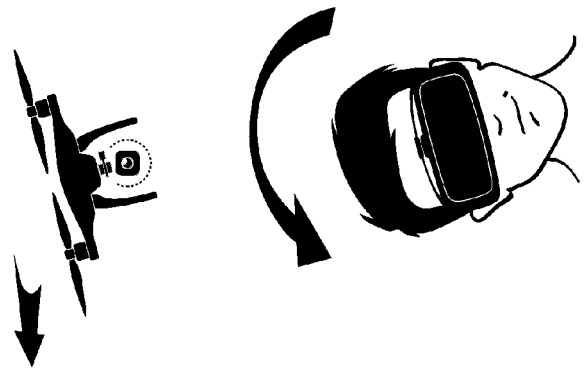

FIGS. 4E and 14E illustrate a "tip right" motion or "tipped right" posture, in this case a rotation of a device like an automobile steering wheel in a clockwise direction around its z-axis. Certain preferred embodiments of the invention use z-axisometer data to determine the degree of tip right of a device, comparing said data to a sensor reference data that indicates both a tip right origin and a tip right neutral zone threshold. If the z-axisometer data indicates a tip right greater than the tip right origin but less than the tip right neutral zone threshold, then the tip right does not cause a change of location of the virtual camera in the VE. If the z-axisometer data indicates tip right greater than the tip right neutral zone threshold, then the tip right causes a change of location of the virtual camera in the VE.

In one preferred embodiment, the tip right origin is preset at $\Delta 0°$ (i.e. vertical) and the tip right neutral zone threshold is preset at $\Delta 10°$ from the origin. When it comes to left/right tip centering, level (as detected by a device) isn't necessarily the same as a person's perceived sense of level. Some people hold one shoulder higher than another, some rest their head at a slight angle, others stand square. As a result, the world is framed differently for different people. Thus, calibrating tip origin to a participant's resting position can yield more comfortable interactions because it cuts down on inadvertent input. In a preferred embodiment, the tip right origin is established on the fly by identifying the average resting posture of the device for a given participant during app launch. Origins and neutral zone thresholds may also be set and/or calibrated, individually or en masse, by participants in a preferences panel.

Z-axisometer data may be derived, for example, from an iOS UI Accelerometer object data feed. Apple's Accelerometer Filter sample code implements a low and high pass filter with optional adaptive filtering. This readily adoptable code smoothes out raw accelerometer data, which can then be converted to an angular value. Apple, Google, Microsoft and other device platform manufacturers provide optional sensor fusion algorithm APIs, which can be programmatically employed to smooth out the stream of sensor data. Apple's Core Motion API uses gyroscope data to smooth out accelerometer data, providing interpolation and fine grain corrections for z-axisometer data free from delayed response and drift.

In certain preferred embodiments, when the device is held perpendicular to the physical ground—the tip right origin in certain preferred embodiments—then the virtual camera view is established parallel with the virtual ground in the VE, as if looking straight ahead without cocking one's head left or right. When the device is tipped right from the tip right origin, then the virtual camera is moderately rotated counter-clockwise around the virtual camera's z-axis to tip the left side of the virtual camera closer to the virtual ground, somewhat compensating for the difference between the virtual horizon and the real horizon as a result of tipping the device. The adjusted angle of the virtual camera need not have a 1:1 inverse correlation with the posture of the device. In a preferred embodiment, the degree of counter-clockwise rotation of the virtual camera view is dampened in comparison to the degree of tip right by a factor of five. For every $\Delta 1°$ of tip right, the camera view is rotated counter-clockwise by $\Delta 0.2°$. This provides sufficient feedback for the participant to maintain awareness of their movement of the device while softening that feedback enough to avoid distraction. In certain preferred embodiments, the degree of counter-clockwise rotation of the virtual camera view is capped at a maximum rotation of $\Delta 10°$ left from level to stabilize the participant experience while the virtual camera is changing position.

Figure 4F:
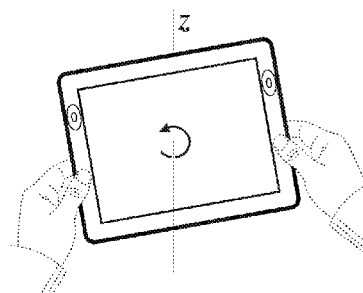
FIG. 4F illustrates a "tip left" or motion or "tipped left" posture.

FIG. 4F illustrates a "tip left" or motion or "tipped left" posture, in this case a rotation of a device like an automobile steering wheel in a counter-clockwise direction around its z-axis. Certain preferred embodiments of the invention use z-axisometer data to determine the degree of tip left of a device, comparing said data to a sensor reference data that indicates both a tip left origin and a tip left neutral zone threshold. If the z-axisometer data indicates a tip left greater than the tip left origin but less than the tip left neutral zone threshold, then the tip left does not cause a change of location of the virtual camera in the VE. If the z-axisometer data indicates tip left greater than the tip left neutral zone threshold, then the tip left causes a change of location of the virtual camera in the VE.

In one preferred embodiment, the tip left origin is preset at $\Delta 0°$ (i.e. vertical) and the tip left neutral zone threshold is preset at $\Delta 10°$ from the origin. When it comes to left/right tip centering, level (as detected by a device) isn't necessarily the same as a person's perceived sense of level. Some people hold one shoulder higher than another, some rest their head at a slight angle, others stand square. As a result, the world is framed differently for different people. Thus, calibrating tip origin to a participant's resting position can yield more comfortable interactions because it cuts down on inadvertent input. In a preferred embodiment, the tip left origin is established on the fly by identifying the average resting posture of the device for a given participant during app launch. Origins and neutral zone thresholds may also be set and/or calibrated, individually or en masse, by participants in a preferences panel.

In certain preferred embodiments, when the device is held perpendicular to the physical ground—the tip left origin in certain preferred embodiments—then the virtual camera view is established parallel with the virtual ground in the VE, as if looking straight ahead without cocking one's head left or right. When the device is tipped left from the tip left origin, then the virtual camera is moderately rotated clockwise around the virtual camera's z-axis to tip the right side of the virtual camera closer to the virtual ground, somewhat compensating for the difference between the virtual horizon and the real horizon as a result of tipping the device. The adjusted angle of the virtual camera need not have a 1:1 inverse correlation with the posture of the device. In a preferred embodiment, the degree of clockwise rotation of the virtual camera view is dampened in comparison to the degree of tip left by a factor of five. For every $\Delta 1°$ of tip left, the camera view is rotated clockwise by $\Delta 0.2°$. This provides sufficient feedback for the participant to maintain awareness of their movement of the device while softening that feedback enough to avoid distraction. In certain preferred embodiments, the degree of clockwise rotation of the virtual camera view is capped at a maximum rotation of $\Delta 10°$ right from level to stabilize the participant experience while the virtual camera is changing position.

Figure 4G:
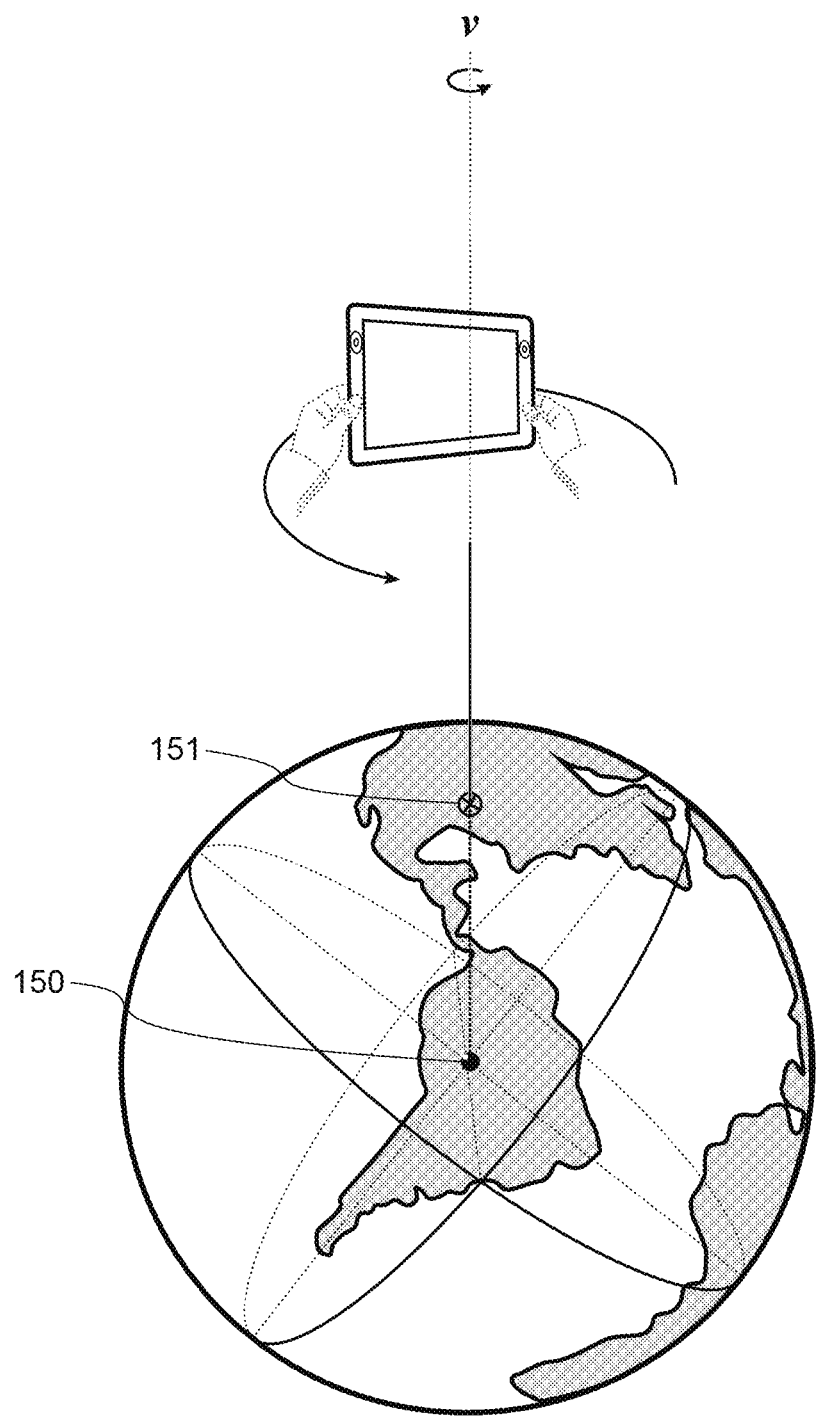
FIG. 4G illustrates an "aim left" motion or "aimed left" posture.

FIG. 4G illustrates an "aim left" motion or "aimed left" posture, in this case a rotation of a device in a counter-clockwise direction around a v-axis. If the participant and device are located in Austin, Tex., then a relevant v-axis may be expressed by a plumb line that extends perpendicular to the Earth's surface at their location in Austin 151 between the sky and the center of the planet 150. An upright participant can accomplish this manipulation by rotating their body and the device to the left whilst holding the device directly in front of them. Certain preferred embodiments of the invention use v-axisometer data to determine the aim of a device. If the v-axisometer data indicates a device orientation to the left of the most recent aim, then the aim left causes the orientation of the virtual camera to be rotated counter-clockwise in the VE. In another embodiment, the v-axisometer data may be compared to a sensor reference data that indicates an aim left origin and/or an aim left neutral zone threshold. In such an embodiment, if the v-axisometer data indicates an aim left greater than the aim left origin but less than the aim left neutral zone threshold, then the aim left does not cause a change of orientation of the virtual camera in the VE.

A v-axisometer sensor reference data origin may be established based on the real-world compass, based on a starting position of an app, based on the resting posture of a device, or based on user preference. Using the compass as an origin enables all participants, wherever located on the planet to engage in a common audiovisual composition with components mapped to specific ordinal referents. In one preferred embodiment, content designed to be located on the east side of a VE requires all participants to aim east in the real world to access such content. Alternately, content designed to be associated with a specific location in the world could base the location of objects in the VE on the relative location of the participant in the real world to such reference location. For example, a video from Kyoto, Japan could appear on the east side of a VE for participants in North America, while on the west side of a VE for participants in China. In a videoconferencing embodiment, the v-axisometer origin may be established based on the posture of the device upon launching the videoconference app, or subsequently calibrated to match the relative configuration of conference attendees.

V-axisometer data may be derived, for example, from an iOS Core Location object data feed. Magnetic heading may be used rather than true heading to avoid usage of a GPS sensor. At the time of writing, iOS magnetometer data is limited to $\Delta 1°$ resolution accuracy. To resolve visible jerkiness in perspective rendering, a preferred embodiment averages the five most recent v-axisometer data results to provide relatively smooth animation transitions between each discrete orientation reading. Apple, Google, Microsoft and other device platform manufacturers also provide sensor fusion algorithm APIs, which can be programmatically employed to smooth out the stream of sensor data. Apple's Core Motion API uses gyroscope data to smooth out magnetometer data, providing interpolation and fine grain corrections for v-axisometer data free from delayed response, drift and magnetic interference.

Figure 4H:
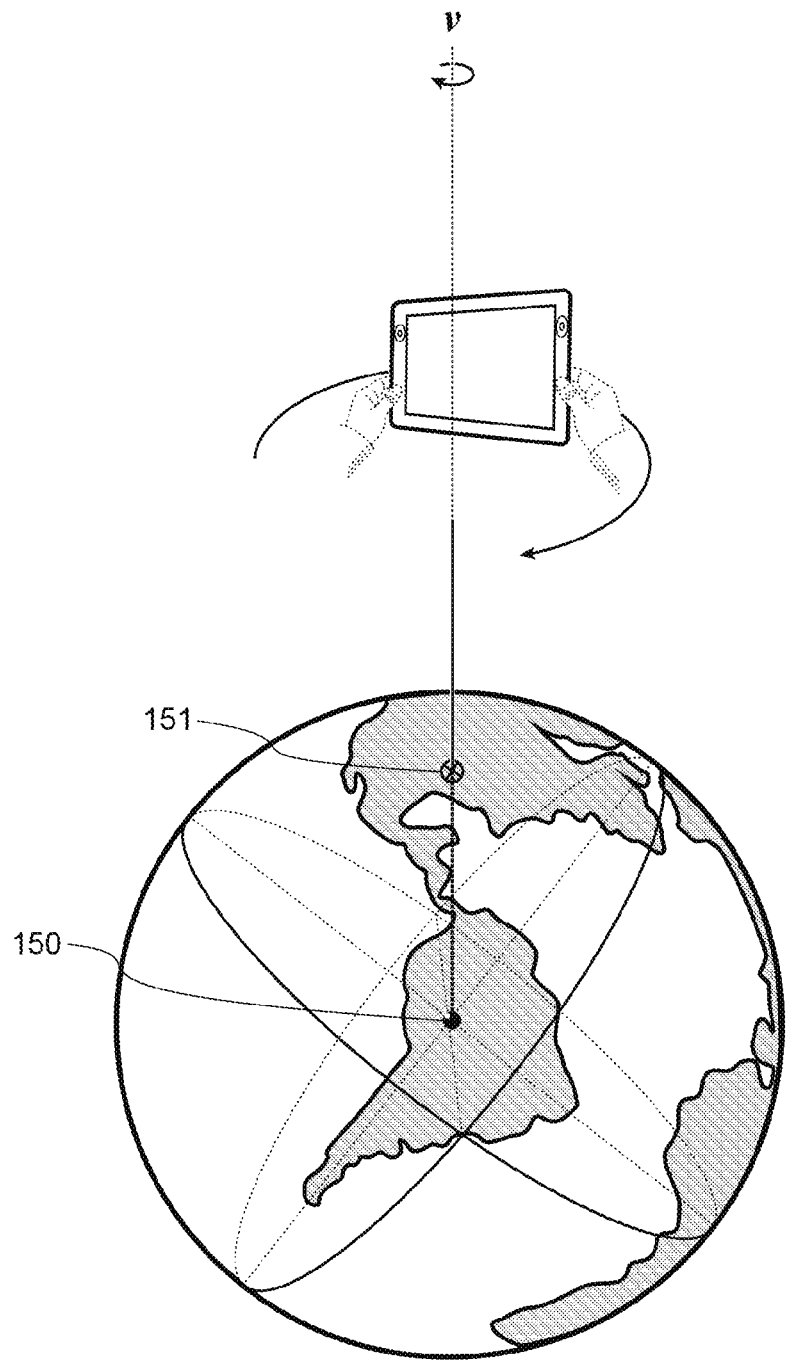
FIGS. 4H and 14H illustrates an "aim right" motion or "aimed right" posture.

FIGS. 4H and 14H illustrate an "aim right" motion or "aimed right" posture, in this case a rotation of a device in a clockwise direction around a v-axis. If the participant and device are located in Austin, Tex., then a relevant v-axis may be expressed by a plumb line that extends perpendicular to the Earth's surface at their location in Austin 151 between the sky and the center of the planet 150. An upright participant can accomplish this manipulation by rotating their body and the device to the right whilst holding the device directly in front of them. Certain preferred embodiments of the invention use v-axisometer data to determine the aim of a device. If the v-axisometer data indicates a device orientation to the right of the most recent aim, then the aim right causes the orientation of the virtual camera to be rotated clockwise in the VE. In another embodiment, the v-axisometer data may be compared to a sensor reference data that indicates an aim right origin and/or an aim right neutral zone threshold. In such an embodiment, if the v-axisometer data indicates an aim right greater than the aim right origin but less than the aim right neutral zone threshold, then the aim right does not cause a change of orientation of the virtual camera in the VE.

Figure 5A:
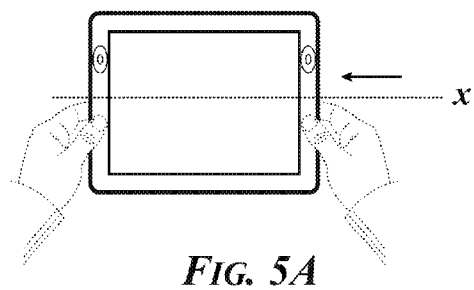
FIG. 5A illustrates a "slide left" motion.

FIG. 5A illustrates a "slide left" motion, in this case moving the device to the left in a straight line along its x-axis. Slide left motions may be detected using an API such as Apple's Core Motion Manager. Slide left motions may be used to initiate video interactions ranging from basic media transport functions (such as pause, fast-forward, rewind, skip forward and skip back) to traversing links from a video to related content (whether or not such related content is video), traversing seamless expansions, engaging interactive advertisements or otherwise directing the flow of a video or the experience.

Figure 5B:
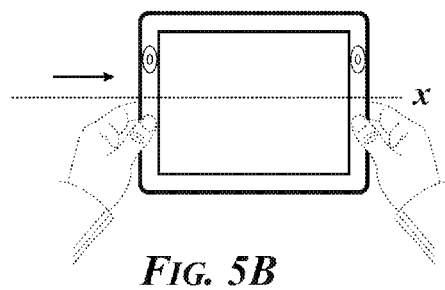
FIG. 5B illustrates a "slide right" motion.

FIG. 5B illustrates a "slide right" motion, in this case moving the device to the right in a straight line along its x-axis. Slide right motions may be detected using an API such as Apple's Core Motion Manager. Slide right motions may be used to initiate video interactions ranging from basic media transport functions (such as pause, fast-forward, rewind, skip forward and skip back) to traversing links from a video to related content (whether or not such related content is video), traversing seamless expansions, engaging interactive advertisements or otherwise directing the flow of a video or the experience.

Figure 5C:
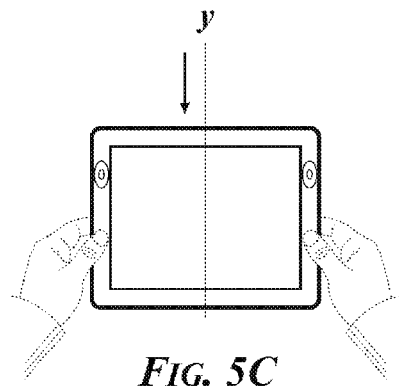
FIG. 5C illustrates a "slide down" motion.

FIG. 5C illustrates a "slide down" motion, in this case moving the device down in a straight line along its y-axis. Slide down motions may be detected using an API such as Apple's Core Motion Manager. Slide down motions may be used to initiate video interactions ranging from basic media transport functions (such as pause, fast-forward, rewind, skip forward and skip back) to traversing links from a video to related content (whether or not such related content is video), traversing seamless expansions, engaging interactive advertisements or otherwise directing the flow of a video or the experience.

Figure 5D:
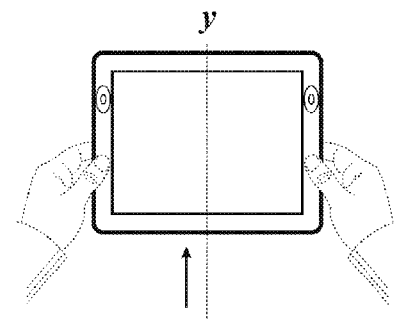
FIG. 5D illustrates a "slide up" motion.

FIG. 5D illustrates a "slide up" motion, in this case moving the device up in a straight line along its y-axis. Slide up motions may be detected using an API such as Apple's Core Motion Manager. Slide up motions may be used to initiate video interactions ranging from basic media transport functions (such as pause, fast-forward, rewind, skip forward and skip back) to traversing links from a video to related content (whether or not such related content is video), traversing seamless expansions, engaging interactive advertisements or otherwise directing the flow of a video or the experience.

Figure 5E:
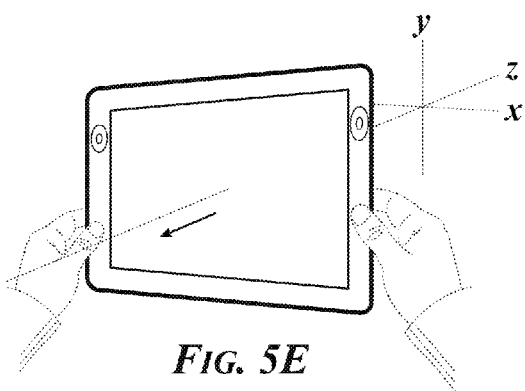
FIG. 5E illustrates a "pull" motion.

FIG. 5E illustrates a "pull" motion, in this case moving the device in a straight line along its z-axis in the direction of the front of the device (i.e. closer to the participant). Pull motions may be detected using an API such as Apple's Core Motion Manager. In certain preferred embodiments, locking the current location and/or orientation of a virtual camera in a VE (a "view lock") may be accomplished with a pull motion so that a device may be subsequently moved or laid down without changing the current location or orientation of the virtual camera. In other preferred embodiments, a pull motion is used to disengage a view lock. In certain embodiments, one or more origins are determined by the posture of the device upon disengagement of the view lock; while in certain embodiments, one or more origins are unaffected by disengaging a view lock. A pull motion may be used to both engage and disengage a view lock. View lock may also be engaged and/or disengaged with a button press or touch screen tap.

Movements may be performed in succession (e.g. pull then push) to effect results. In certain embodiments, a pull-based movement sequence is used to jump the virtual camera to an optimal viewing location (but not necessarily optimal orientation) in relation to content in view. In certain embodiments, such a gesture both jumps the virtual camera to this optimal viewing location and engages a view lock. The view lock may be used to establish a view lock neutral zone or to extend the range of a neutral zone already in place around one or more axes of device movement.

In other preferred embodiments, a pull motion may be used to initiate video interactions ranging from basic media transport functions (such as pause, fast-forward, rewind, skip forward and skip back) to traversing links from a video to related content (whether or not such related content is video), traversing seamless expansions, engaging interactive advertisements or otherwise directing the flow of a video or the experience.

Figure 5F:
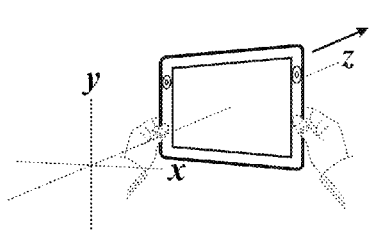
FIG. 5F illustrates a "push" motion.

FIG. 5F illustrates a "push" motion, in this case moving the device in a straight line along its z-axis in the direction of the back of the device (i.e. further from the participant). Push motions may be detected using an API such as Apple's Core Motion Manager. In certain preferred embodiments, a push motion is used to engage a view lock so that a device may be subsequently moved or laid down without changing the current location or orientation of the virtual camera. In other preferred embodiments, a push motion is used to disengage a view lock. In certain embodiments, one or more origins are determined by the posture of the device upon disengagement of the view lock; while in certain embodiments, one or more origins are unaffected by disengaging a view lock. A push motion may be used to both engage and disengage a view lock. View lock may also be engaged and/or disengaged with a button press or screen tap.

Movements may be performed in succession (e.g. push then pull) to effect results. In certain embodiments, a push-based movement sequence is used to jump the virtual camera to an optimal viewing location (but not necessarily optimal orientation) in relation to content in view. In certain embodiments, such a gesture both jumps the virtual camera to this optimal viewing location and engages a view lock. The view lock may be used to establish a view lock neutral zone or to extend the range of a neutral zone already in place around one or more axes of device movement.

In other preferred embodiments, a push motion may be used to initiate video interactions ranging from basic media transport functions (such as pause, fast-forward, rewind, skip forward and skip back) to traversing links from a video to related content (whether or not such related content is video), traversing seamless expansions, engaging interactive advertisements or otherwise directing the flow of a video or the experience.

Interaction Sequences

Figure 6A:
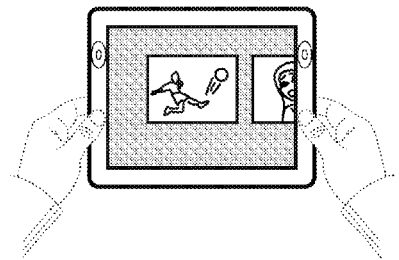
FIGS. 6A, 6B and 6C illustrate a pivot down interaction sequence and related visual display states.
Figure 7A:
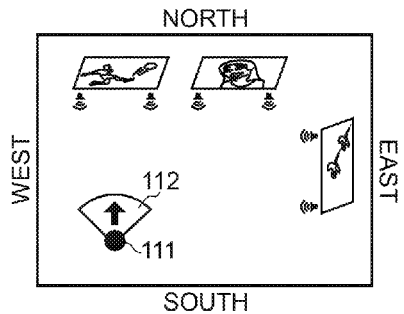
FIGS. 7A, 7B and 7C illustrate virtual camera posture and orientation states corresponding to interaction sequence states illustrated in FIGS. 6A, 6B and 6C respectively.
Figure 6B:
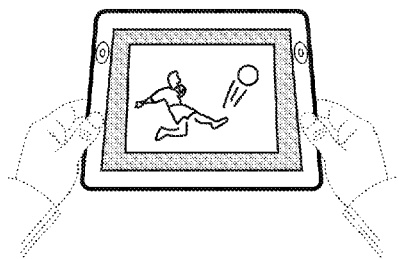
Figure 7B:
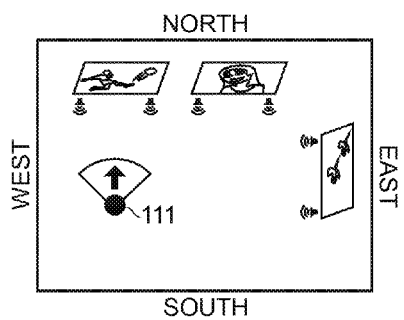
Figure 6C:
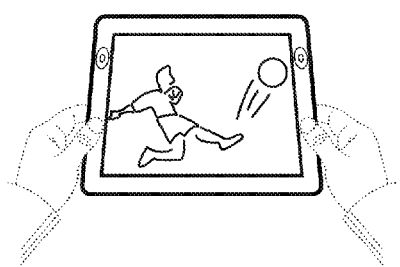
Figure 7C:
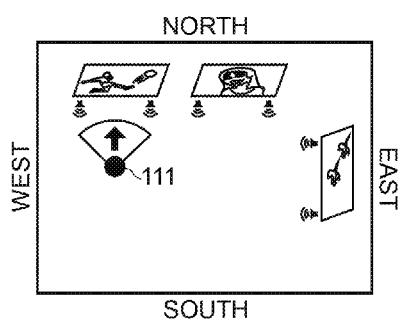

FIGS. 6A, 6B and 6C illustrate a pivot down interaction sequence and related visual display states. FIG. 6A represents a device starting posture while FIGS. 6B and 6C represent interaction sequence transition states. FIGS. 7A, 7B and 7C illustrate virtual camera posture 111 and orientation 112 states in VE 110 corresponding to interaction sequence states illustrated in FIGS. 6A, 6B and 6C respectively.

FIG. 6A represents a device starting posture and FIG. 7A illustrates the virtual camera starting in the southwest region of the VE facing north. Videos mapped to video panes 113, 116 and 119 are playing. Video pane 113 and a portion of video pane 116 are visible on visual display 101. Virtual speakers 114 and 115 are directly ahead, while virtual speakers 117, 118, 120 and 121 are to the right. Auditory devices 102 and/or 106 emphasize (e.g. display at a higher relative volume) sounds virtually emanating from virtual speaker 114 while auditory devices 103 and/or 107 emphasize sounds virtually emanating from virtual speakers 115, 117, 118, 120 and 121. In other words, sounds to the left of the center of focus of the virtual camera in the VE are produced for a participant as if they're coming from the left; and sounds to the right of the center of focus of the virtual camera in the VE are produced for a participant as if they're coming from the right. Sounds emanating from virtual speakers closer to the virtual camera, such as 114 and 115, are emphasized over sounds emanating from virtual speakers farther from the virtual camera, such as 118 and 120. Devices with a single audio display, capable of monophonic sound only, may be limited to the latter distance-based distinction; however this limitation can be remedied by attaching stereo headphones 104 to the device.

FIG. 6B illustrates a transitory pivot down interaction state and FIG. 7B illustrates that the virtual camera has moved north. Video mapped to video panes 113, 116 and 119 continue to play. Video pane 113 is displayed larger on visual display 101, while sounds from virtual speakers 114 and 115 are produced louder.

FIG. 6C illustrates a second pivot down interaction state and FIG. 7C illustrates that the virtual camera has moved further north. Video mapped to video panes 113, 116 and 119 continue to play. Video pane 113 now fills the visual display 101, while sounds from virtual speakers 114 and 115 are produced even louder. In comparison with the state illustrated in FIG. 6A, the sounds from virtual speakers 114 and 115 are stereoscopically more distinct because the relative angle between the virtual camera orientation and each virtual speaker is pronounced.

In a preferred embodiment, velocity of virtual camera forward movement is related to pivot up in the following manner using the following equations. First, data about the device's x-axis rotation posture is compared against an origin to determine whether the device is pivoted down—by subtracting an origin from the raw x-axisometer data to determine relative pivot down (if any). Second, if the relative pivot down is greater than a maximum pivot down of Δ50° then the relative pivot down is set to 50°. Third, the relative pivot down is compared against a neutral zone threshold. If the relative pivot down is greater than the threshold, then the threshold is subtracted from the relative pivot down to determine active pivot down. The active pivot down value is multiplied by (−cos(((v-axisometer data)+90.0)/180.0*Pi)) to determine a basis of travel along one vector of the floor of the VE; and the active pivot down value is multiplied by (−sin(((v-axisometer data)+90.0)/180.0*Pi)) to determine a basis of travel along the other vector of the floor of the VE. These bases of travel are normalized for consistency across devices with varying processor speeds, divided by a dampening factor of 60 and then added to each of the current location point variables. If the newly calculated location is outside the bounds of the VE, then the new location is set inside the bounds of the VE.

Thus, in this embodiment, the virtual camera moves forward proportionally faster as the device is pivoted down farther from the origin. In other preferred embodiments, the virtual camera moves forward at a fixed rate regardless of degree of pivot down. In other preferred embodiments, the forward movement of the virtual camera is speed limited. A variety of equations may be used to translate pivot down data into virtual camera forward movement including but not limited to linear, exponential, geometric and other curved functions.

Figure 6D:
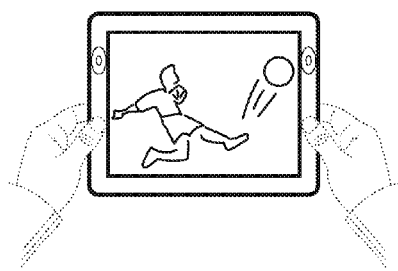
FIGS. 6D, 6E and 6F illustrate a pivot up interaction sequence and related visual display states.
Figure 7D:
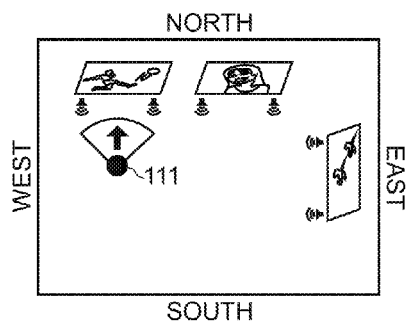
FIGS. 7D, 7E and 7F illustrate virtual camera location and orientation states corresponding to interaction sequence states illustrated in FIGS. 6D, 6E and 6F respectively.
Figure 6E:
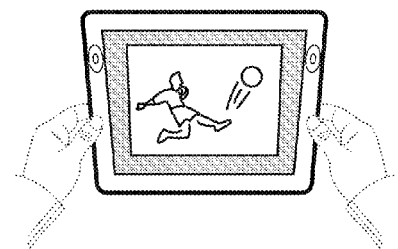
Figure 7E:
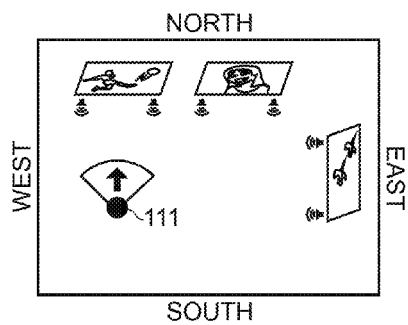
Figure 6F:
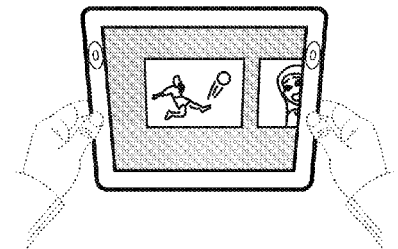
Figure 7F:
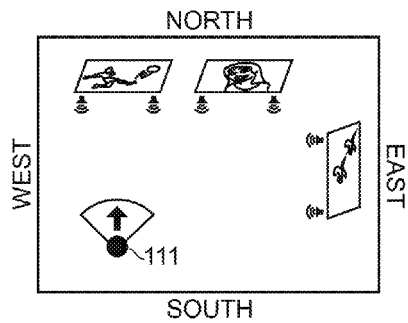

FIGS. 6D, 6E and 6F illustrate a pivot up interaction sequence and related visual display states. FIG. 6D represents a device starting posture while FIGS. 6E and 6F represent interaction sequence transition states. FIGS. 7D, 7E and 7F illustrate virtual camera location 111 and orientation 112 states corresponding to interaction sequence states illustrated in FIGS. 6D, 6E and 6F respectively.

FIG. 6D represents a device starting posture and FIG. 7D illustrates the virtual camera starting in the northwest region of the VE facing north. Videos mapped to video panes 113, 116 and 119 are playing. Video pane 113 fills the visual display 101. Sounds emanating from virtual speaker 114 are produced primarily for display primarily by auditory devices 102 and/or 106 (as if coming from the left); while sounds emanating from virtual speakers 115, 117, 118, 120 and 121 are produced for display primarily by auditory devices 103 and/or 107 (as if coming from the right). Sounds from virtual speakers 114 and 115 are produced relatively louder than the other virtual speakers farther from the virtual camera. Devices with a single audio display, capable of monophonic sound only, may be limited to the latter distance-based distinction; however this limitation can be remedied by attaching stereo headphones 104 to the device.

FIG. 6E illustrates a transitory pivot up interaction state and FIG. 7E illustrates that the virtual camera has moved south. Video mapped to video panes 113, 116 and 119 continue to play. Video pane 113 is displayed smaller on visual display 101, while sounds from virtual speakers 114 and 115 are produced quieter.

FIG. 6F illustrates a second pivot up interaction state and FIG. 7F illustrates that the virtual camera has moved further south. Video mapped to video panes 113, 116 and 119 continue to play. Video pane 113 and a portion of video pane 116 are now visible on visual display 101, while sounds from virtual speakers 114 and 115 are produced even quieter. In comparison with the state illustrated in FIG. 6D, the sounds from virtual speakers 114 and 115 are stereoscopically less distinct because the relative angle between the virtual camera orientation and each virtual speaker is reduced.

In a preferred embodiment, velocity of virtual camera backward movement is related to pivot up in the following manner using the following equations. First, data about the device's x-axis rotation posture is compared against an origin to determine whether the device is pivoted up—by subtracting an origin from the raw x-axisometer data to determine relative pivot up (if any). Second, if the relative pivot up is greater than a maximum pivot up of Δ50° then the relative pivot up is set to 50°. Third, the relative pivot up is compared against a neutral zone threshold. If the relative pivot down is greater than the threshold, then the threshold is subtracted from the relative pivot down to determine active pivot up. The active pivot up value is multiplied by (−cos(((v-axisometer data)+90.0)/180.0*Pi)) to determine a basis of travel along one vector of the floor of the VE; and the active pivot up value is multiplied by (−sin(((v-axisometer data)+90.0)/180.0*Pi)) to determine a basis of travel along the other vector of the floor of the VE. These bases of travel are normalized for consistency across devices with varying processor speeds, divided by a dampening factor of 60 and then added to each of the current location point variables. If the newly calculated location is outside the bounds of the VE, then the new location is set inside the bounds of the VE.

Thus, in this embodiment, the virtual camera moves backward proportionally faster as the device is pivoted up farther from the origin. In other preferred embodiments, the virtual camera moves backward at a fixed rate regardless of degree of pivot up. In other preferred embodiments, the backward movement of the virtual camera is speed limited. A variety of equations may be used to translate pivot up data into virtual camera backward movement including but not limited to linear, exponential, geometric and other curved functions.

Figure 8A:
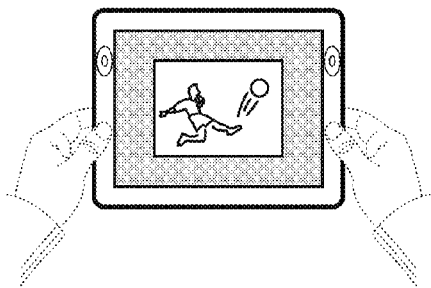
FIGS. 8A, 8B and 8C illustrate a pivot right interaction sequence and related visual display states.
Figure 9A:
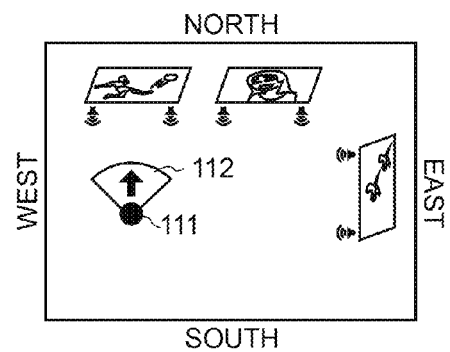
FIGS. 9A, 9B and 9C illustrate virtual camera location and orientation states corresponding to interaction sequence states illustrated in FIGS. 8A, 8B and 8C respectively.
Figure 8B:
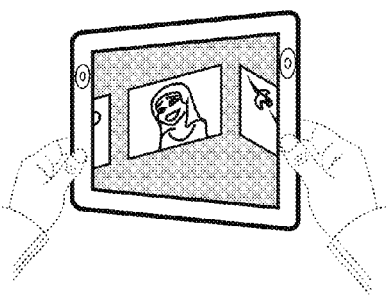
Figure 9B:
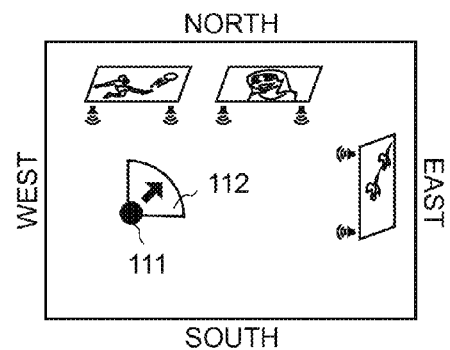
Figure 8C:
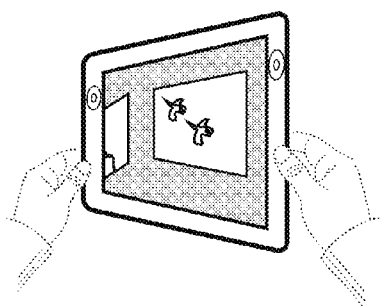
Figure 9C:
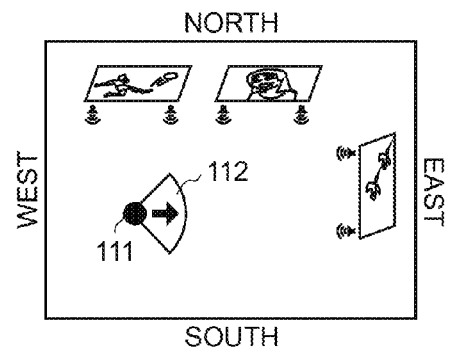

FIGS. 8A, 8B and 8C illustrate an aim right interaction sequence and related visual display states. FIG. 8A represents a device starting posture while FIGS. 8B and 8C represent interaction sequence transition states. FIGS. 9A, 9B and 9C illustrate virtual camera location 111 and orientation 112 states in VE 110 corresponding to interaction sequence states illustrated in FIGS. 8A, 8B and 8C respectively.

FIG. 8A represents a device starting posture and FIG. 9A illustrates the virtual camera starting in the west region of the VE facing north. Videos mapped to video panes 113, 116 and 119 are playing. Video pane 113 fills a portion of visual display 101. Sounds emanating from virtual speaker 114 are produced primarily for display primarily by auditory devices 102 and/or 106 (as if coming from the left); while sounds emanating from virtual speakers 115, 117, 118, 120 and 121 are produced for display primarily by auditory devices 103 and/or 107 (as if coming from the right). Sounds from virtual speakers 114 and 115 are produced relatively louder than the other virtual speakers farther from the virtual camera. Devices with a single audio display, capable of monophonic sound only, may be limited to the latter distance-based distinction; however this limitation can be remedied by attaching stereo headphones 104 to the device.

FIG. 8B illustrates a transitory aim right interaction state and FIG. 9B illustrates that the virtual camera orientation has rotated clockwise to face northeast. Video mapped to video panes 113, 116 and 119 continue to play. Video pane 116 is now centered on visual display 101 with portions of video panes 113 and 119 to the left and right. Sound from virtual speaker 114 is produced to be more clearly coming from the left.

FIG. 8C illustrates a second aim right interaction state and FIG. 9C illustrates that the virtual camera has rotated further clockwise to face directly east. Video mapped to video panes 113, 116 and 119 continue to play. Video pane 119 is now centered on the visual display 101. Sounds from virtual speakers 114 and 115 are both now produced as if coming from the left while sounds from virtual speakers 120 and 121 are now produced as if coming from straight ahead.

Figure 8D:
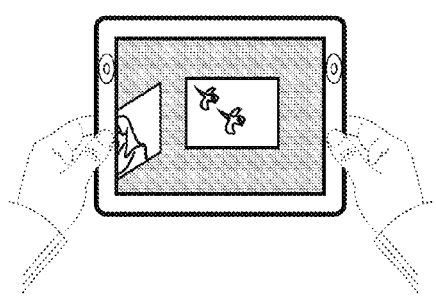
FIGS. 8D, 8E and 8F illustrate a pivot left interaction sequence and related visual display states.
Figure 9D:
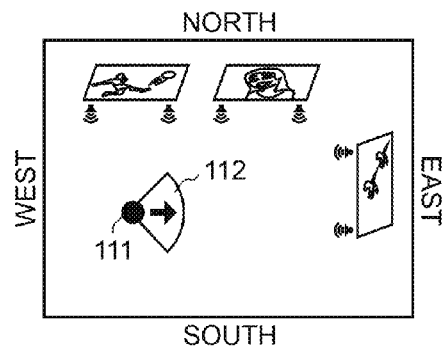
FIGS. 9D, 9E and 9F illustrate virtual camera location and orientation states corresponding to interaction sequence states illustrated in FIGS. 8D, 8E and 8F respectively.
Figure 8E:
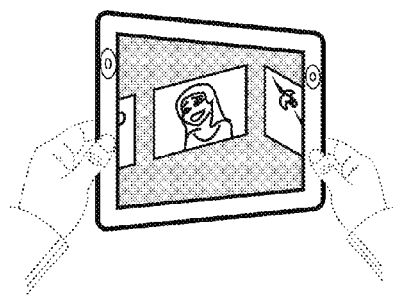
Figure 9E:
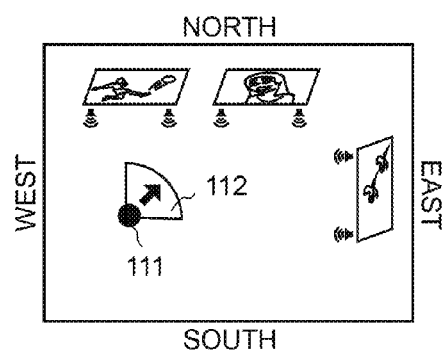
Figure 8F:
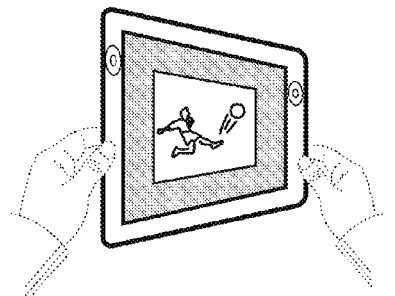
Figure 9F:
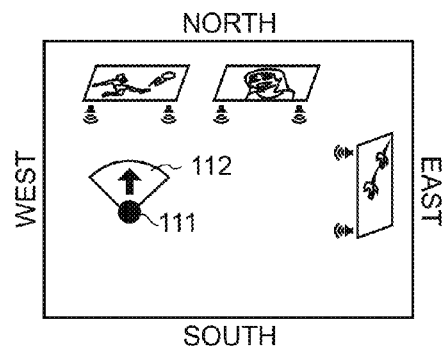

FIGS. 8D, 8E and 8F illustrate an aim left interaction sequence and related visual display states. FIG. 8D represents a device starting posture while FIGS. 8E and 8F represent interaction sequence transition states. FIGS. 9D, 9E and 9F illustrate virtual camera location 111 and orientation 112 states corresponding to interaction sequence states illustrated in FIGS. 8D, 8E and 8F respectively.

FIG. 8D represents a device starting posture and FIG. 9D illustrates the virtual camera starting in the west region of the VE facing east. Videos mapped to video panes 113, 116 and 119 are playing. Video pane 119 fills a portion of visual display 101. Sounds emanating from virtual speaker 114, 115, 117, 118 are produced for display primarily by auditory devices 102 and/or 106 (as if coming from the left); while sounds emanating from virtual speakers 120 and 121 are generally centered between left and right, though somewhat stereoscopically distinct. Sounds from virtual speakers 114 and 115 are produced relatively louder than the other virtual speakers farther from the virtual camera. Devices with a single audio display, capable of monophonic sound only, may be limited to the latter distance-based distinction; however this limitation can be remedied by attaching stereo headphones 104 to the device.

FIG. 8E illustrates a transitory aim left interaction state and FIG. 9E illustrates that the virtual camera orientation has rotated counter-clockwise to face northeast. Video mapped to video panes 113, 116 and 119 continue to play. Video pane 116 is now centered on visual display 101 with portions of video panes 113 and 119 to the left and right. Sound from virtual speaker 115 is produced to be more centrally sourced and less clearly coming from the left.

FIG. 8F illustrates a second aim left interaction state and FIG. 9F illustrates that the virtual camera has rotated further counter-clockwise to face directly north. Video mapped to video panes 113, 116 and 119 continue to play. Video pane 113 is now centered on the visual display 101 and neither video pane 116 nor 119 are visible. Sounds emanating from virtual speakers 120 and 121 now are produced for display primarily by auditory devices 103 and/or 107 (as if coming from the right), while sounds from virtual speakers 114 and 115 are now generally centered between left and right, though somewhat stereoscopically distinct.

Figure 10A:
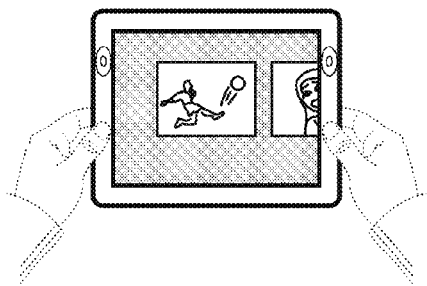
FIGS. 10A, 10B and 10C illustrate a tip right interaction sequence and related visual display states.
Figure 11A:
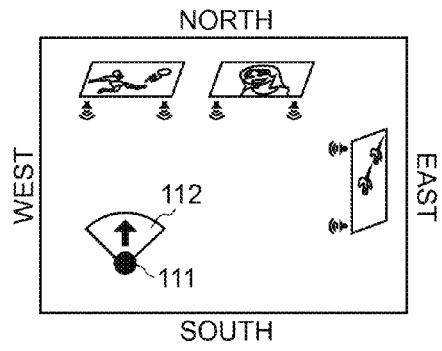
FIGS. 11A, 11B and 11C illustrate virtual camera location and orientation states corresponding to interaction sequence states illustrated in FIGS. 10A, 10B and 10C respectively.
Figure 10B:
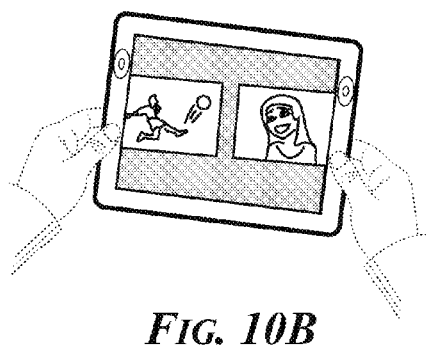
Figure 11B:
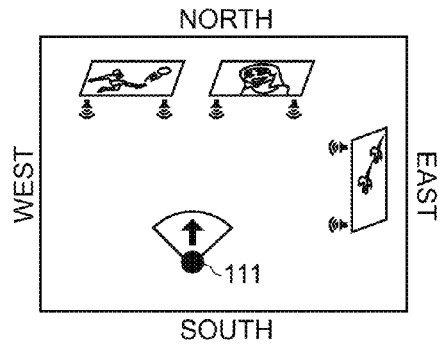
Figure 10C:
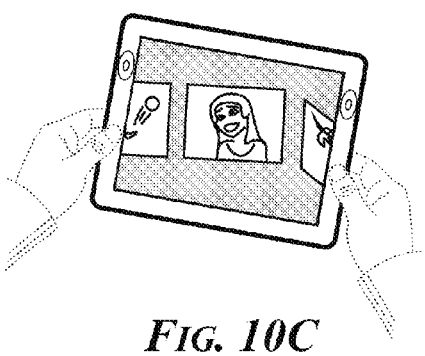
Figure 11C:
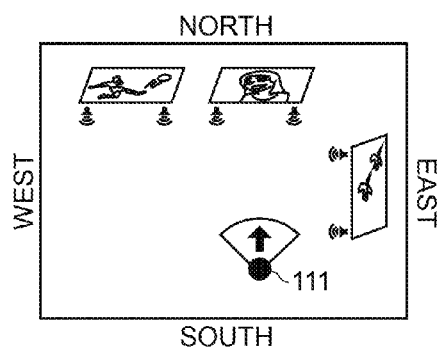

FIGS. 10A, 10B and 10C illustrate a tip right interaction sequence and related visual display states. FIG. 10A represents a device starting posture while FIGS. 10B and 10C represent interaction sequence transition states. FIGS. 11A, 11B and 11C illustrate virtual camera location 111 and orientation 112 states in VE 110 corresponding to interaction sequence states illustrated in FIGS. 10A, 10B and 10C respectively.

FIG. 10A represents a device starting posture and FIG. 11A illustrates the virtual camera starting in the southwest region of the VE facing north. Videos mapped to video panes 113, 116 and 119 are playing. Video pane 113 and a portion of video pane 116 are visible on visual display 101. Virtual speakers 114 and 115 are directly ahead, while virtual speakers 117, 118, 120 and 121 are to the right. Auditory devices 102 and/or 106 emphasize (e.g. display at a higher relative volume) sounds virtually emanating from virtual speaker 114 while auditory devices 103 and/or 107 emphasize sounds virtually emanating from virtual speakers 115, 117, 118, 120 and 121.

FIG. 10B illustrates a transitory tip right interaction state and FIG. 11B illustrates that the virtual camera has moved eastward. Video mapped to video panes 113, 116 and 119 continue to play. Video panes 113 and 116 are centered on visual display 101, while sounds from virtual speakers 120 and 121 are produced louder on the right than before. The virtual camera has rotated around its z-axis counter-clockwise to bring the horizon in the VE closer to parallel with the real ground—counter-balancing the tip right of the device.

FIG. 10C illustrates a second tip right interaction state and FIG. 11C illustrates that the virtual camera has moved further east. Video mapped to video panes 113, 116 and 119 continue to play. Video pane 116 is now centered in the visual display 101, while sounds from virtual speakers 120 and 121 are produced even louder on the right.

In a preferred embodiment of the invention, tip right of a device will not result in movement of the virtual camera if the virtual camera is currently moving forward or backward in response to pivot down or pivot up interactions. It is generally easier for participants to do one thing at a time, and such separating of pivot axes reduces the chances of accidental actuation and simplifies the overall user experience. While rightward virtual camera movement is suppressed during forward and backward movement, counter-clockwise rotation of the virtual camera to fluidly maintain the virtual horizon is not suppressed. This maintains the illusion of multidirectional control without evidencing the aforementioned suppression. For skilled 3D navigators, however, enabling movement along both axes simultaneously can provide more interaction control.

In a preferred embodiment, velocity of virtual camera movement to the right is related to tip right in the following manner using the following equations. First, data about the device's z-axis rotation posture is compared against an origin to determine whether the device is tipped right—by subtracting an origin from the raw z-axisometer data to determine relative tip right (if any). Second, if the relative tip right is greater than a maximum tip right of 50° then the relative tip right is set to 50°. Third, the relative tip right is compared against a neutral zone threshold. If the relative tip right is greater than the threshold, then the threshold is subtracted from the relative tip right to determine active tip right. The active tip right value is multiplied by (−cos(((v-axisometer data)+90.0)/180.0*Pi)) to determine a basis of travel along one vector of the floor of the VE; and the active tip right value is multiplied by (−sin(((v-axisometer data)+ 90.0)/180.0*Pi)) to determine a basis of travel along the other vector of the floor of the VE. These bases of travel are normalized for consistency across devices with varying processor speeds, divided by a dampening factor of 120 and then added to each of the current location point variables. If the newly calculated location is outside the bounds of the VE, then the new location is set inside the bounds of the VE.

Thus, in this embodiment, the virtual camera moves right proportionally faster as the device is tipped right farther from the origin. In other preferred embodiments, the virtual camera moves right at a fixed rate regardless of degree of tip right. In other preferred embodiments, the rightward movement of the virtual camera is speed limited. A variety of equations may be used to translate tip right data into virtual camera rightward movement including but not limited to linear, exponential, geometric and other curved functions.

Figure 10D:
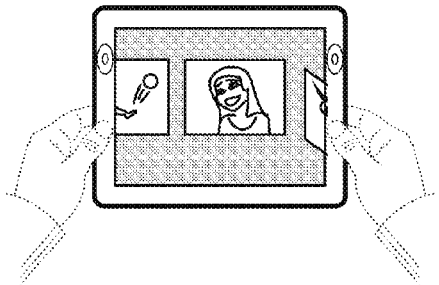
FIGS. 10D, 10E and 10F illustrate a tip left interaction sequence and related visual display states.
Figure 11D:
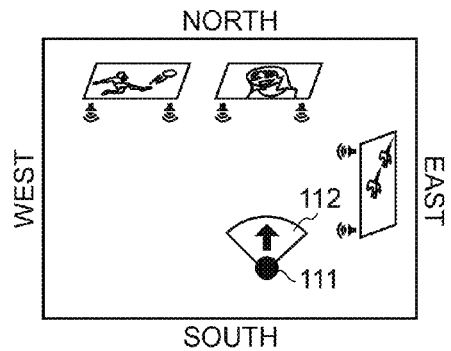
FIGS. 11D, 11E and 11F illustrate virtual camera location and orientation states corresponding to interaction sequence states illustrated in FIGS. 10D, 10E and 10F respectively.
Figure 10E:
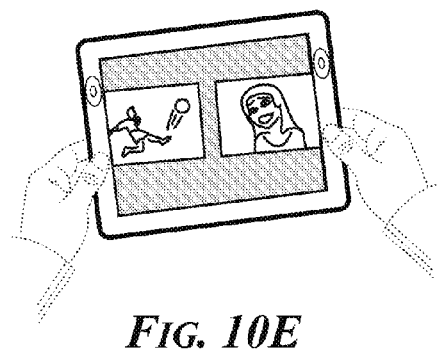
Figure 11E:
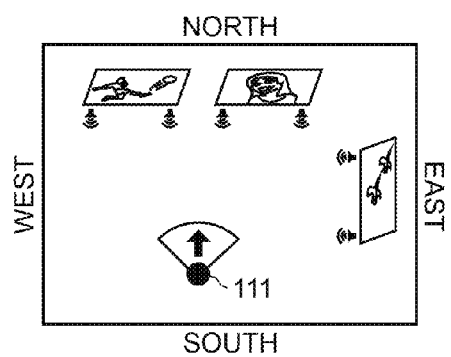
Figure 10F:
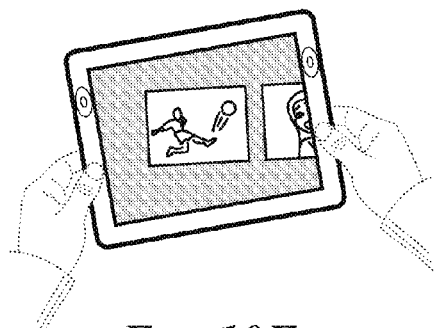
Figure 11F:
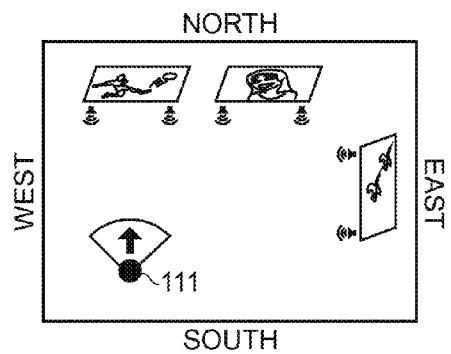

FIGS. 10D, 10E and 10F illustrate a tip left interaction sequence and related visual display states. FIG. 10D represents a device starting posture while FIGS. 10E and 10F represent interaction sequence transition states. FIGS. 11D, 11E and 11F illustrate virtual camera location 111 and orientation 112 states corresponding to interaction sequence states illustrated in FIGS. 10D, 10E and 10F respectively.

FIG. 10D represents a device starting posture and FIG. 11D illustrates the virtual camera starting in the southeast region of the VE facing north. Videos mapped to video panes 113, 116 and 119 are playing. Video pane 116 and a portion of video panes 113 and 119 are visible on visual display 101. Virtual speakers 114 and 115 are to the left, virtual speakers 117 and 118 are directly ahead, and virtual speakers 120 and 121 are to the right. Auditory devices 102 and/or 106 emphasize (e.g. display at a higher relative volume) sounds virtually emanating from virtual speaker 114, 115 and 117 while auditory devices 103 and/or 107 emphasize sounds virtually emanating from virtual speakers 118, 120 and 121.

FIG. 10E illustrates a transitory tip left interaction state and FIG. 11E illustrates that the virtual camera has moved westward. Video mapped to video panes 113, 116 and 119 continue to play. Video panes 113 and 116 are centered on visual display 101, while sounds from virtual speakers 120 and 121 are produced softer on the right than before. The virtual camera has rotated around its z-axis clockwise to bring the horizon in the VE closer to parallel with the real ground counter-balancing the tip left of the device.

FIG. 10F illustrates a second tip left interaction state and FIG. 11F illustrates that the virtual camera has moved further west. Video mapped to video panes 113, 116 and 119 continue to play. Video pane 113 is now centered in the visual display 101, while sounds from virtual speakers 120 and 121 are produced even quieter on the right.

In a preferred embodiment of the invention, tip left of a device will not result in movement of the virtual camera if the virtual camera is currently moving forward or backward in response to pivot down or pivot up interactions. It is generally easier for participants to do one thing at a time, and such separating of pivot axes reduces the chances of accidental actuation and simplifies the overall user experience. While leftward virtual camera movement is suppressed during forward and backward movement, clockwise rotation of the virtual camera to fluidly maintain the virtual horizon is not suppressed. This maintains the illusion of multidirectional control without evidencing the aforementioned suppression. For skilled 3D navigators, however, enabling movement along both axes simultaneously can provide more interaction control.

In a preferred embodiment, velocity of virtual camera movement to the left is related to tip left in the following manner using the following equations. First, data about the device's z-axis rotation posture is compared against an origin to determine whether the device is tipped left—by subtracting an origin from the raw z-axisometer data to determine relative tip left (if any). Second, if the relative tip left is greater than a maximum tip left of 50° then the relative tip left is set to 50°. Third, the relative tip left is compared against a neutral zone threshold. If the relative tip left is greater than the threshold, then the threshold is subtracted from the relative tip left to determine active tip left. The active tip left value is multiplied by (−cos(((v-axisometer data)+90.0)/180.0*Pi)) to determine a basis of travel along one vector of the floor of the VE; and the active tip left value is multiplied by (−sin (((v-axisometer data)+90.0)/180.0*Pi)) to determine a basis of travel along the other vector of the floor of the VE. These bases of travel are normalized for consistency across devices with varying processor speeds, divided by a dampening factor of 120 and then added to each of the current location point variables. If the newly calculated location is outside the bounds of the VE, then the new location is set inside the bounds of the VE.

Thus, in such an embodiment, the virtual camera moves left proportionally faster as the device is tipped left farther from the origin. In other preferred embodiments, the virtual camera moves left at a fixed rate regardless of degree of tip left. In other preferred embodiments, the leftward movement of the virtual camera is speed limited. A variety of equations may be used to translate tip left data into virtual camera leftward movement including but not limited to linear, exponential, geometric and other curved functions.

In a preferred embodiment of the invention, the above described interaction mappings are combined to result in a coherent gestalt user experience. An example interaction sequence based on the VE model illustrated in FIG. 3 using device 100 might occur as follows. Start by standing in the northwest corner of the VE close to the soccer game playing in video pane 113, as illustrated in FIG. 6D. Pivot up to walk backward (south) through FIG. 6E to arrive at the state illustrated in FIG. 8A. Aim right to change the orientation of the virtual camera through FIGS. 8B and 8C to rest in the state illustrated in FIG. 8D, revealing the active videoconference stream in video pane 116 and the playing bird documentary in video pane 119 to the northeast and east, respectively. Now, as illustrated in FIG. 8D, game action emanating from virtual speakers 114 and 115 is only audible from the left audio display 102 and/or 106. To view said game action, aim left through FIGS. 8E and 8F to rest at the state illustrated by FIG. 10A. Finally, tip right to relocate the virtual camera eastward through FIGS. 10B and 10C to arrive at the state illustrated in FIG. 10D. The virtual camera is now located in the southeast region of the VE and the videoconference stream video pane is centered on the visual display. The soccer match is now audible to the left and the birds are now audible to the right.

Figure 12:
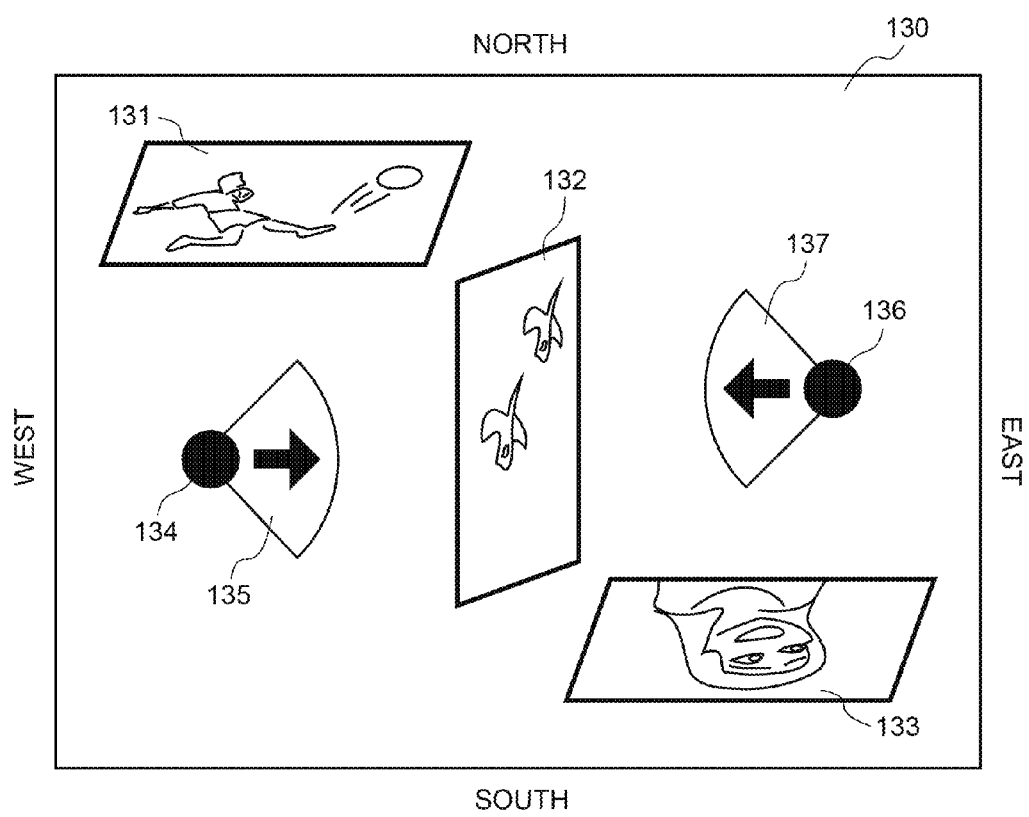
FIG. 12 illustrates a representative model of an architectural scale manifold vista VE.

FIG. 12 illustrates a representative model of an architectural scale manifold vista VE 130 containing video pane 131 in the northwest region, video pane 133 in the southeast region, and video pane 132 centrally located. A virtual camera is located 134 on the west side of the space with a lens orientation 135 facing towards the east. An alternate location 136 of the virtual camera is on the east side of the space with an alternate lens orientation 137 facing towards the west. Video pane 133 is obscured from virtual camera location 134 by video pane 132; and video pane 131 is obscured from virtual camera location 136 by video pane 132. The invention is particularly useful in architectural scale manifold vista spaces because access to each content element requires the participant to travel though the space (with benefit of peripatetic sense) and to change orientation (with benefit of proprioceptive sense).

Video Pane Characteristics

Video panes and virtual speakers may appear, disappear, change size or shape, or change location in space at temporal locations predetermined before a given participant experience or at temporal locations determined in part or in whole on the fly.

When a video pane is visible from more than one side, the video pane's content may be automatically flipped around the video pane's y-axis when viewed from the backside of the video pane to maintain the content's original facing. This approach would be critical in the event that words, such as subtitles, are part of the video content. Alternately, video content may be produced in reverse from the backside of the video pane.

Video panes may be opaque to other video panes and objects in the VE, or may be transparent. In one preferred embodiment, video panes are produced at 75% opacity, hinting at detail necessary for navigating a manifold vista VE without compromising the experience of the video content.

Whether transparent or not, participants may be permitted to walk directly through video panes or be blocked from such passage. If permitted to pass through video panes, audio feedback and/or video effects may assist in participant comprehension of such transaction. Video panes and other objects in the VE may optionally be used as portals that bridge non-neighboring regions of the VE—enabling a participant to travel, for example, directly from a pane located in the northwest region of a VE to a pane located in the southeast region of the VE. Portal interactions may also be used for traversing hyperlinks or for entry into and exit from a VE.

It should be understood that characteristics of, transformations of, and interactions with video panes in a VE may be generalized to other content forms including but not limited to still images, text documents, web pages, maps, graphs and 3D objects.

Exemplary Hardware Configuration

Figure 13:
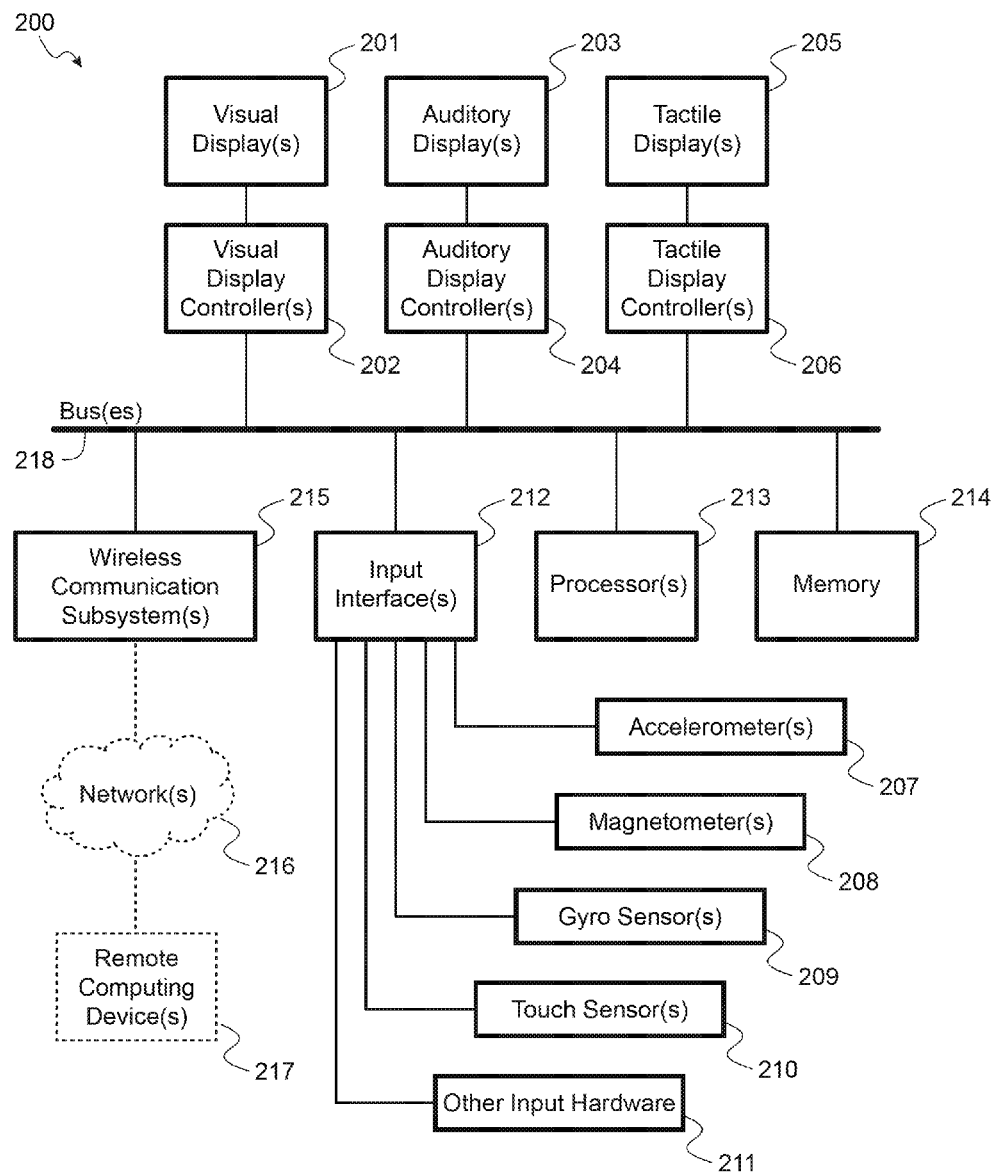
FIG. 13 is a block diagram of an exemplary hardware configuration model for a device implementing the participant experience described in reference to FIGS. 1-12 and 14.

FIG. 13 is a block diagram of an exemplary hardware configuration model 200 for a device implementing the participant experience described in reference to FIGS. 1-12 and 14. Exemplary hardware devices include Apple's iPad and iPhone devices, Samsung's Galaxy phones and tablets, mobile devices built on Google's Android platform, Microsoft's Surface tablet computers. Alternate hardware devices include Google's Project Glass wearable computers and Microsoft's X-BOX 360 game consoles equipped with Kinect motion sensing input hardware.

From a participant interaction perspective, the device can include one or more visual display(s) 201 coupled with one or more visual display controller(s) 202, one or more auditory display(s) 203 coupled with one or more auditory display controller(s) 204, and one or more tactile display(s) 205 coupled with one or more tactile display controller(s) 206. It can include one or more accelerometer(s) 207, one or more magnetometer(s) 208, one or more gyro sensor(s) 209, one or more touch sensor(s) 210, and one or more other input hardware 211 (such as hardware button(s), camera(s) and/or other proximity sensing and/or motion sensing technologies) each coupled to one or more input interface(s) 212.

The device can include one or more processor(s) 213 and one or more memory bank(s) 214 connected to one another and connected to the various display controller(s) and input interface(s) via one or more bus(es) 218. It can also be coupled with one or more wireless communication subsystem(s) 215 that communicate through one or more wireless network(s) 216 to one or more remote computing device(s) 217.

APPLICABILITY

The claimed invention may be used for navigating in a variety of contexts including but not limited to productions of artistic expression, theatrical prototyping, architectural simulation, street-view mapping, gaming, remote control of vehicles, augmented reality, virtual reality, videoconferencing and other telepresence applications, and user interfaces for document and image searching, browsing and retrieval. Virtual environments containing polylinear video and audio have already been discussed at length. The peripatetic proprioceptive experience principles and solutions disclosed apply to a variety of other applications making use of virtual or virtual-like environments.

Architects can prototype buildings and museum exhibit curators can prototype the design of exhibits, then test virtual experiences of the space and fine tune before physical construction.

Augmented reality applications can be enhanced by enabling participants to travel in the modeled space without having to change their location in the physical world.

Games situated in virtual environments, for example, can be improved by enabling participants to move around more naturally without overloading the visual display with buttons.

Street-view maps can be transformed into a form of VE. Rather than mouse-clicking or finger-tapping on a visual display interface to move from virtual camera location to virtual camera location, the present invention enables participants to more easily navigate the map environment and experience the captured streets (or other spaces) with proprioceptive perspective.

Extemporaneous control of remote objects can be made more natural using the invention, enabling a participant to pivot, tip and aim a handheld or head mounted device to control a remote-controlled toy or full-sized military tank, for example. If the vehicle is outfitted with a camera, then the participant may see the remote location from first-person proprioceptive perspective.

A frequently expressed need in the domain of videoconferencing involves effective techniques for spatializing and navigating amongst attendee video panes and related document content. The present invention can overturn the rigid seating arrangements and unwieldy display limitations of current-day multi-party videoconferencing systems in favor of a portable experience that uses intuitive and comfortable interactions.

Other social media, such as a navigable VE-based telepresence event may be transformed by adding peripatetic proprioceptive interactions, complete with soundscape cocktail party effects. As a participant moves their avatar through the VE, conversations overheard amongst virtual attendees close by in the space are produced louder than conversations further away.

The present invention may be used in improve the participant experience of searching, browsing and retrieving documents and images from large databases, whether locally or remotely stored. Contents of search results may be distributed in two or three dimensions akin to a distribution of video panes in a VE, thus enabling a participant to move through the plurality of results using peripatetic and/or proprioceptive interactions. Gestures such as push and pull may be used to tag and/or collect results of interest and/or initiate subsequent filtering of navigable results produced for browsing in the space.

Some embodiments are set forth in the following clauses:

CLAUSE A: One or more non-transitory computer readable storage media comprising instructions that, when executed by a computer having one or more sensors and associated with a head-mounted display apparatus and a remote controllable vehicle having an on-board camera, are capable of causing the computer to:
  a. generate a signal to display video from the remote vehicle's camera;
  b. generate a signal to control the movement of the remote vehicle;
  c. generate a signal to establish an orientation of the remote vehicle's camera;
  d. generate a signal to update the location of the remote vehicle in a direction of the orientation of the remote vehicle's camera on a level plane using x-axisometer data from at least one of the sensors indicating pivot up or pivot down of the head-mounted apparatus and an x-axisometer sensor reference data, wherein said use of x-axisometer sensor data to update the location of the remote vehicle is effectively decoupled from use of v-axisometer sensor data, thereby enabling v-axisometer sensor data of the computer to be used independently of x-axisometer sensor data of the computer to update the orientation of the remote vehicle's camera; and
  e. generate a signal to update the orientation of the remote vehicle's camera using v-axisometer data from at least one of the sensors indicating pivot left or pivot right of the head-mounted apparatus and a v-axisometer sensor reference data, wherein said use of v-axisometer sensor data to update the orientation of the remote vehicle's camera is effectively decoupled from use of x-axisometer sensor data, thereby enabling x-axisometer sensor data of the computer to be used independently of v-axisometer sensor data of the computer to update the location of the remote vehicle.

B. The computer readable storage media of clause A, wherein the video from the vehicle's camera is produced to appear three-dimensional.

C. The computer readable storage media of clause B, wherein the video from the vehicle's camera comprises a videoconference stream.

D. The computer readable storage media of clause A, wherein:
  a. the updated location of the vehicle is established in a direction of the orientation of the vehicle's camera on a level plane if the x-axisometer data indicates a pivot down posture relative to the x-axisometer sensor reference data; and
  b. the updated location of the vehicle is established in an opposite direction of the orientation of the vehicle's camera on a level plane if the x-axisometer data indicates a pivot up posture relative to the x-axisometer sensor reference data.

E. The computer readable storage media of clause A, wherein the x-axisometer sensor reference data comprises one or more neutral zone thresholds.

F. The computer readable storage media of clause A, wherein the magnitude of vehicle's location change is based on the x-axisometer data relative to the x-axisometer sensor reference data.

G. The computer readable storage media of clause A, wherein:
  a. the updated orientation of the vehicle's camera is established left if the v-axisometer data indicates an aim left posture relative to the v-axisometer sensor reference data; and
  b. the updated orientation of the vehicle's camera is established right if the v-axisometer data indicates an aim right posture relative to the v-axisometer sensor reference data.

H. The computer readable storage media of clause A, wherein the v-axisometer sensor reference data comprises one or more neutral zone thresholds.

I. The computer readable storage media of clause A, wherein the instructions are further capable of causing the computer to generate a signal to update the location of the vehicle in a direction perpendicular to the axis of the orientation of the vehicle's camera on a level plane using z-axisometer data from at least one of the sensors indicating tip left or tip right of the head-mounted apparatus and a z-axisometer sensor reference data.

J. The computer readable storage media of clause I, wherein:
  a. the updated location of the vehicle is established in a direction perpendicularly left of the orientation of the vehicle's camera on a level plane if the z-axisometer data indicates a tip left posture relative to the z-axisometer sensor reference data; and
  b. the updated location of the vehicle is established in a direction perpendicularly right of the orientation of the vehicle's camera on a level plane if the z-axisometer data indicates a tip right posture relative to the z-axisometer sensor reference data.

K. The computer readable storage media of clause A, wherein the instructions are further capable of causing the computer to generate a signal to jump the vehicle to a new location.

L. The computer readable storage media of clause A, wherein the instructions are further capable of causing the computer to generate a signal to establish a view lock of the vehicle, wherein control of the location of the vehicle is blocked or control of the orientation of the vehicle's camera is blocked or control of both the location of the vehicle and the orientation of the vehicle's camera is blocked.

CLAUSE M: One or more non-transitory computer readable storage media comprising instructions that, when executed by a computer having one or more sensors and associated with a head-mounted display apparatus and a remote controllable vehicle having an on-board camera, are capable of causing the computer to:
  a. generate a signal to display video from the remote vehicle's camera;
  b. generate a signal to control the movement of the remote vehicle;
  c. generate a signal to establish an orientation of the remote vehicle's camera; and
  d. generate a signal to update the location of the remote vehicle's camera using z-axisometer data from at least one of the sensors indicating tip left or tip right of the head-mounted apparatus and a z-axisometer sensor reference data, wherein said use of z-axisometer sensor data to update the location of the remote vehicle is effectively decoupled from use of v-axisometer sensor data, thereby enabling v-axisometer sensor data of the computer to be used independently of z-axisometer sensor data of the computer to update the orientation of the remote vehicle's camera, and:
  i. the location of the remote vehicle's camera is established in a direction perpendicularly left of the orientation of the remote vehicle's camera on a level plane if the z-axisometer data indicates a tip left posture relative to the z-axisometer sensor reference data; and
  ii. the location of the remote vehicle is established in a direction perpendicularly right of the orientation of the remote vehicle's camera on a level plane if the z-axisometer data indicates a tip right posture relative to the z-axisometer sensor reference data.

N. The computer readable storage media of clause M, wherein the video from the vehicle's camera is produced to appear three-dimensional.

O. The computer readable storage media of clause M, wherein the z-axisometer sensor reference data comprises one or more neutral zone thresholds.

P. The computer readable storage media of clause M, wherein the magnitude of vehicle change is based on the z-axisometer data relative to the z-axisometer sensor reference data.

CLAUSE Q: One or more non-transitory computer readable storage media comprising instructions that, when executed by a computer having one or more sensors and associated with a head-mounted display apparatus and a remote controllable vehicle having an on-board camera, are capable of causing the computer to:
  a. generate a signal to display video from the remote vehicle's camera;
  b. generate a signal to control the movement of the remote vehicle;
  c. generate a signal to establish an orientation of the remote vehicle's camera;
  d. generate a signal to update the location of the remote vehicle in a direction of the orientation of the remote vehicle's camera on a level plane using x-axisometer data from at least one of the sensors indicating pivot up or pivot down of the head-mounted apparatus and an x-axisometer sensor reference data, wherein said use of x-axisometer sensor data to update the location of the remote vehicle is effectively decoupled from use of v-axisometer sensor data, thereby enabling v-axisometer sensor data of the computer to be used independently of x-axisometer sensor data of the computer to update the orientation of the remote vehicle's camera, and:
    i. the location of the remote vehicle is established in a direction of the orientation of the remote vehicle's camera on a level plane if the x-axisometer data indicates a pivot down posture relative to the x-axisometer sensor reference data;
    ii. the location of the remote vehicle is established in an opposite direction of the orientation of the remote vehicle's camera on a level plane if the x-axisometer data indicates a pivot up posture relative to the x-axisometer sensor reference data; and
    iii. the magnitude of remote vehicle location change is based on x-axisometer data relative to x-axisometer sensor reference data; and
  e. generate a signal to update the orientation of the remote vehicle's camera using v-axisometer data from at least one of the sensors indicating pivot left or pivot right of the head-mounted apparatus and a v-axisometer sensor reference data, wherein said use of v-axisometer sensor data to update the orientation of the remote vehicle's camera is effectively decoupled from use of x-axisometer sensor data, thereby enabling x-axisometer sensor data of the computer to be used independently of v-axisometer sensor data of the computer to update the location of the remote vehicle, and:
    i. the orientation of the remote vehicle's camera is established left if the v-axisometer data indicates an aim left posture relative to a v-axisometer sensor reference data; and
    ii. the orientation of the remote vehicle's camera is established right if the v-axisometer data indicates an aim right posture relative to the v-axisometer sensor reference data.

R. The computer readable storage media of clause Q, wherein the instructions are further capable of causing the computer to generate a signal to update the location of the vehicle's camera using z-axisometer data from at least one of the sensors indicating tip left or tip right of the head-mounted apparatus and a z-axisometer sensor reference data, and:
  i. the location of the vehicle is established in a direction perpendicularly left of the orientation of the vehicle's camera on a level plane if the z-axisometer data indicates a tip left posture relative to the z-axisometer sensor reference data;
  ii. the location of the vehicle is established in a direction perpendicularly right of the orientation of the vehicle's camera on a level plane if the z-axisometer data indicates a tip right posture relative to the z-axisometer sensor reference data; and
  iii. the magnitude of vehicle location change is based on z-axisometer data relative to z-axisometer sensor reference data.

S. The computer readable storage media of clause Q, wherein the instructions are further capable of causing the computer to generate a signal to jump the vehicle to a new location in response to a movement sequence.

T. The computer readable storage media of clause Q, wherein the instructions are further capable of causing the computer to generate a signal to establish a view lock of the vehicle in response to a movement sequence, wherein the location of the vehicle is blocked or the orientation of the vehicle's camera is blocked or both the location of the vehicle and the orientation of the vehicle's camera are blocked.

Having now set forth the preferred embodiments and certain modifications of the concepts underlying the present invention—which are meant to be exemplary and not limiting—various other embodiments and uses as well as certain variations and modifications thereto may obviously occur to those skilled in the art upon becoming familiar with the underlying concepts. It is to be understood, therefore, that the invention may be practiced otherwise than as specifically set forth herein, including using sensors, apparatus, programming languages, toolkits and algorithms (including adding steps, removing steps, reversing the interpretation of motions, and changing the order of procedures) other than those described to effectuate the user experiences disclosed herein.

What is claimed is:

1. One or more non-transitory computer readable storage media comprising instructions that, when executed by a computer having one or more sensors and associated with a head-mounted display apparatus and a remote controllable vehicle having an on-board camera, are capable of causing the computer to:
- a. generate a signal to control the movement of the remote vehicle in the physical world;
- b. generate a signal to establish an orientation of the remote vehicle's camera;
- c. generate signal to update the location of the remote vehicle in response to data from at least one of the sensors of the head-mounted apparatus relating to a first axis of movement of the head-mounted display apparatus;
- d. generate a signal to update the orientation of the remote vehicle's camera in response to data from at least one of the sensors of the head-mounted apparatus relating to a second axis of movement of the head-mounted display apparatus independent from the first axis of movement of the head-mounted display apparatus;
- e. generate a signal to display video of the physical world captured by the remote vehicle's camera; and
- f. generate a signal to overlay one or more augmented visual elements over a display of the video of the physical world captured by the remote vehicle's camera, wherein movement of the one or more augmented visual elements tracks with movement of the physical world captured by the remote vehicle's camera.

2. The computer readable storage media of claim 1, wherein at least one of the augmented visual elements comprises graphical and/or textual indicia relating to one or more locations in the physical world.

3. The computer readable storage media of claim 2, wherein at least one of the graphical and/or textual indicia comprises a name of a location or street in the physical world.

4. The computer readable storage media of claim 2, wherein at least one of the graphical and/or textual indicia comprises a rendered simulation of an architectural structure.

5. The computer readable storage media of claim 1, wherein at least one of the augmented visual elements comprises fictional content.

6. The computer readable storage media of claim 5, wherein the fictional content comprises one or more game elements.

7. The computer readable storage media of claim 6, wherein at least one of the game elements is animated.

8. The computer readable storage media of claim 1, wherein at least one of the augmented visual elements comprises video.

9. The computer readable storage media of claim 1, wherein at least a portion of one of the augmented visual elements obscures at least a portion of an object in the physical world captured by the remote vehicle's camera.

10. The computer readable storage media of claim 1, wherein at least a portion of one of the augmented visual elements is obscured by at least a portion of an object in the physical world captured by the remote vehicle's camera.

11. A method performed by a computer having one or more sensors and associated with a head-mounted display apparatus and a remote controllable vehicle having an on-board camera, comprising the acts of:
- a. generating a signal to control the movement of the remote vehicle in the physical world;
- b. generating a signal to establish an orientation of the remote vehicle's camera;
- c. generating a signal to update the location of the remote vehicle in response to data from at least one of the sensors of the head-mounted display apparatus relating to a first axis of movement of the head-mounted display apparatus;
- d. generating a signal to update the orientation of the remote vehicle's camera in response to data from at least one of the sensors of the head-mounted display apparatus relating to a second axis of movement of the head-mounted display apparatus independent from the first axis of movement of the head-mounted display apparatus;
- e. generating a signal to display video of the physical world captured by the remote vehicle's camera; and
- f. generating a signal to overlay one or more augmented visual elements over a display of the video of the physical world captured by the remote vehicle's camera, wherein movement of the one or more augmented visual elements tracks with movement of the physical world captured by the remote vehicle's camera.

12. The method of claim 11, wherein at least one of the augmented visual elements comprises graphical and/or textual indicia relating to one or more locations in the physical world.

13. The method of claim 12, wherein at least one of the graphical and/or textual indicia comprises a name of a location or street in the physical world.

14. The method of claim 12, wherein at least one of the graphical and/or textual indicia comprises a rendered simulation of an architectural structure.

15. The method of claim 11, wherein at least one of the augmented visual elements comprises fictional content.

16. The method of claim 15, wherein the fictional content comprises one or more game elements.

17. The method of claim 16, wherein at least one of the game elements is animated.

18. The method of claim 11, wherein at least one of the augmented visual elements comprises video.

19. The method of claim 11, wherein at least a portion of one of the augmented visual elements obscures at least a portion of an object in the physical world captured by the remote vehicle's camera.

20. The method of claim 11, wherein at least a portion of one of the augmented visual elements is obscured by at least a portion of an object in the physical world captured by the remote vehicle's camera.

* * * * *